United States Patent
Yan et al.

(10) Patent No.: US 12,004,109 B2
(45) Date of Patent: Jun. 4, 2024

(54) COMMUNICATION METHOD AND APPARATUS, AND DEVICE AND MEDIUM IN DEACTIVATED STATE OF SECONDARY CELL GROUP

(71) Applicant: DATANG MOBILE COMMUNICATIONS EQUIPMENT CO., LTD., Beijing (CN)

(72) Inventors: Xue Yan, Beijing (CN); Meng Xu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/260,933

(22) PCT Filed: Dec. 21, 2021

(86) PCT No.: PCT/CN2021/140201
§ 371 (c)(1),
(2) Date: Jul. 10, 2023

(87) PCT Pub. No.: WO2022/148240
PCT Pub. Date: Jul. 14, 2022

(65) Prior Publication Data
US 2024/0098669 A1    Mar. 21, 2024

(30) Foreign Application Priority Data
Jan. 8, 2021 (CN) .......................... 202110025123.0

(51) Int. Cl.
*H04W 56/00* (2009.01)
*H04B 7/06* (2006.01)
*H04B 17/309* (2015.01)

(52) U.S. Cl.
CPC ...... *H04W 56/0045* (2013.01); *H04B 7/0626* (2013.01); *H04B 7/06964* (2023.05); *H04B 17/309* (2015.01); *H04W 56/001* (2013.01)

(58) Field of Classification Search
CPC ............ H04W 56/0045; H04W 56/001; H04B 7/0626; H04B 7/06964; H04B 17/309
See application file for complete search history.

(56) References Cited

U.S. PATENT DOCUMENTS

| 2018/0027481 | A1* | 1/2018 | Xu ........................ H04L 5/0048 |
| | | | 370/252 |
| 2018/0234912 | A1* | 8/2018 | Islam .................... H04W 24/08 |
| 2020/0229081 | A1* | 7/2020 | Ang .................. H04W 72/0453 |

FOREIGN PATENT DOCUMENTS

| CN | 109391965 A | 2/2019 |
| CN | 110012549 A | 7/2019 |
| WO | 2020197460 A1 | 10/2020 |

OTHER PUBLICATIONS

China Telecom, "Discussion on efficient SCG activation/deactivation", 3GPP TSG-RAN WG2 Meeting #112-e, Online, Nov. 2-13, 2020, total 4 pages, R2-2009913.

(Continued)

*Primary Examiner* — Kyaw Z Soe
(74) *Attorney, Agent, or Firm* — Kilpatrick Townsend & Stockton LLP

(57) ABSTRACT

The present application provides a communication method and apparatus, and a device and a medium in a deactivated state of a secondary cell group. The method includes: determining signal measurement and/or timing of a terminal for a secondary cell group (SCG) and/or a primary SCG cell (PSCell) of the SCG when the SCG is in a deactivated state; reconfiguring the signal measurement and/or the timing according to first information if the first information is acquired; where the first information indicates a communi- (Continued)

cation status between the terminal and the PSCell related to the signal measurement and/or the timing, or, the first information is instruction information of a network device received by the terminal.

14 Claims, 6 Drawing Sheets

(56) References Cited

OTHER PUBLICATIONS

Huawei, "[Post111-e][919][eDCCA] Efficient activation deactivation of SCG Discussion on SCG deactivation and activation", 3GPP TSG-RAN WG2#112-e, Online, Nov. 2-13, 2020, total 20 pages, R2-2010123.

ISA State Intellectual Property Office of the People's Republic of China, International Search Report Issued in Application No. PCT/CN2021/140201, dated Mar. 9, 2022, WIPO, 9 pages.

* cited by examiner

COMMUNICATION METHOD AND APPARATUS, AND DEVICE AND MEDIUM IN DEACTIVATED STATE OF SECONDARY CELL GROUP

CROSS-REFERENCE TO RELATED APPLICATIONS

This application is a National Stage of International Application No. PCT/CN2021/140201, filed on Dec. 21, 2021, which claims priority to Chinese patent application No. 202110025123.0, filed on Jan. 8, 2021. Both of the above applications are hereby incorporated by reference in their entireties.

FIELD

The present application relates to the field of communication, and in particular, to a communication method and apparatus, and a device and a medium in a deactivated state of a secondary cell group.

BACKGROUND

In some communication network architecture, a network side includes a master node (Master Node, Main Node, or Primary Node, MN, or PN) and a secondary node (SN). The cell group on the MN side is a master cell group (Master Cell Group, Main Cell Group, or Primary Cell Group, MCG or PCG), which includes a primary cell (PCell) and zero to multiple secondary cells (SCell). The cell group on the SN side is a secondary cell group (SCG), which includes a primary SCG cell (PSCell) and zero to multiple secondary cells.

In a dual connectivity (DC) scenario, an MN and an SN can interact with a terminal in a connected state simultaneously. In view of power saving, and fast activation of SCG for data transmission, an SCG can be configured to be in a deactivated state in the case of small or no data transmission between the terminal and the network devices, where an SCG deactivated state is also equivalent to an SCG dormant state (dormant), an SCG suspend state (suspend), a PSCell deactivated state, a PSCell dormant state, or a PSCell suspend state.

In the SCG deactivated state, how the behavior of the terminal side is executed is not clear, so there's no relevant solution to support the behavior of the terminal in the SCG deactivated state at present.

SUMMARY

The present application provides a communication method and apparatus, and a device and a medium in a deactivated state of a secondary cell group, to solve that it is not clear how the terminal behavior on the terminal side is executed in the SCG deactivated state, resulting in that the rationality of the terminal behavior configuration on the terminal side in the SCG deactivated state needs to be improved.

In a first aspect, the present application provides a communication method in a deactivated state of a secondary cell group (SCG), which is applied to a terminal, including:
determining signal measurement and/or timing of the SCG and/or a primary SCG cell (PSCell) of the SCG when the SCG is in the deactivated state;
reconfiguring the signal measurement and/or the timing according to first information if the first information is acquired;
where the first information indicates a communication status between the terminal and the PSCell related to the signal measurement and/or the timing, or, the first information is instruction information of a network device received by the terminal.

In an embodiment, the signal measurement includes beam failure detection of the PSCell, and the first information indicates that the terminal detects a beam failure of the PSCell.

In an embodiment, the reconfiguring the signal measurement and/or the timing according to the first information includes:
if the signal measurement further includes one or more of the following of the PSCell: beam failure recovery, sounding reference signal (SRS) transmission, channel state information reference signal (CSI-RS) measurement and/or reporting, radio resource management (RRM) measurement based on SCG measurement configuration, radio link monitoring (RLM) measurement, and/or, the timing includes uplink timing advance timer (TAT) operation of the PSCell, stopping one or more executions of the signal measurement and/or the timing according to the first information; and/or,
if the signal measurement further includes one or more of the following of the SCG: beam failure recovery, beam failure detection, SRS transmission, CSI-RS measurement and/or reporting, RRM measurement based on SCG measurement configuration, RLM measurement, and/or, the timing includes uplink TAT operation of the SCG, stopping one or more executions of the signal measurement and/or the timing of the SCG, or one or more executions of the signal measurement and/or the timing of the PSCell in the SCG and/or a specified secondary cell (SCell) in the SCG, according to the first information.

In an embodiment, the timing includes uplink TAT operation of the PSCell, and the first information indicates that the uplink TAT of the PSCell expires.

In an embodiment, the reconfiguring the signal measurement and/or the timing according to the first information includes:
if the signal measurement includes one or more of the following of the primary SCG cell PSCell: beam failure detection, beam failure recovery, SRS transmission, CSI-RS measurement and/or reporting, RRM measurement based on SCG measurement configuration, RLM measurement, stopping one or more executions of the signal measurement and/or the timing according to the first information; and/or,
if the signal measurement includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stopping one or more executions of the signal measurement and/or the timing of the SCG, or one or more executions of the signal measurement and/or the timing of the PSCell in the SCG and/or a specified secondary cell (SCell) in the SCG, according to the first information.

In an embodiment, the signal measurement further includes one or more of the following: RRM measurement for the SCG, RLM measurement for the PSCell, CSI-RS measurement for the SCG and/or the PSCell;

the reconfiguring the signal measurement and/or the timing according to the first information includes:

for one or more of the signal measurement, if a measurement cycle of the signal measurement is a first cycle, switching the measurement cycle of the signal measurement from the first cycle to a second cycle according to the first information; or for one or more of the signal measurement, if a measurement cycle of the signal measurement is a second cycle, switching the measurement cycle of the signal measurement from the second cycle to a first cycle according to the first information;

where the first cycle is greater than the second cycle.

In an embodiment, the signal measurement includes beam failure recovery of the PSCell, and the first information indicates that the terminal completes the beam failure recovery for the PSCell successfully; and/or, the timing includes uplink TAT operation of the PSCell, and the first information indicates that the terminal restarts an uplink TAT for the PSCell.

In an embodiment, the signal measurement further includes one or more of the following: RRM measurement for the SCG, RLM measurement for the PSCell, CSI-RS measurement for the SCG and/or the PSCell;

the reconfiguring the signal measurement and/or the timing according to the first information includes:

for one or more of the signal measurement, if a measurement cycle of the signal measurement is a second cycle, switching the measurement cycle of the signal measurement from the second cycle to a first cycle according to the first information; or for one or more of the signal measurement, if a measurement cycle of the signal measurement is a first cycle, switching the measurement cycle of the signal measurement from the first cycle to a second cycle according to the first information; where the first cycle is greater than the second cycle.

In an embodiment, the signal measurement includes RLM measurement of the PSCell, and the first information indicates that the terminal detects that a radio link failure occurs in the PSCell.

In an embodiment, the reconfiguring the signal measurement and/or the timing according to the first information includes:

if the signal measurement further includes one or more of the following of the PSCell: beam failure detection, beam failure recovery, SRS transmission, CSI-RS measurement and/or reporting, RRM measurement based on SCG measurement configuration, and/or the timing includes uplink TAT operation of the PSCell, stopping one or more executions of the signal measurement and/or the timing according to the first information; and/or, if the signal measurement further includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stopping one or more executions of the signal measurement and/or the timing of the SCG, or one or more executions of the signal measurement and/or the timing of the PSCell in the SCG and/or a specified secondary cell SCell in the SCG, according to the first information.

In an embodiment, the signal measurement includes one or more of the following: RRM measurement for the SCG, RLM measurement for the PSCell, CSI-RS measurement for the SCG and/or the PSCell, and the first information indicates that a timer of one or more of the signal measurement expires;

the reconfiguring the signal measurement and/or the timing according to the first information includes:

if a measurement cycle of the signal measurement which expires is a second cycle, switching the measurement cycle of the signal measurement which expires from the second cycle to a first cycle according to the first information: or, if a measurement cycle of the signal measurement which expires is a first cycle, switching the measurement cycle of the signal measurement which expires from the first cycle to a second cycle according to the first information;

where the first cycle is greater than the second cycle.

In an embodiment, the signal measurement includes one or more of the following: RRM measurement for the SCG, RLM measurement for the PSCell, CSI-RS measurement for the SCG and/or the PSCell, and the first information is instruction information related to one or more of the signal measurement received by the terminal and sent by the network device;

the reconfiguring the signal measurement and/or the timing according to the first information includes:

for the one or more of the signal measurement indicated by the first information, if a measurement cycle of the signal measurement is a second cycle, switching the measurement cycle of the signal measurement from the second cycle to a first cycle according to the first information; or for the one or more of the signal measurement indicated by the first information, if a measurement cycle of the signal measurement is a first cycle, switching the measurement cycle of the signal measurement from the first cycle to a second cycle according to the first information;

where the first cycle is greater than the second cycle.

In a second aspect, the present application provides a terminal, including a memory, a transceiver, and a processor:

the memory being configured to store a computer program;

the transceiver being configured to send and receive data under control of the processor;

the processor being configured to read the computer program in the memory and execute the following operations:

determining signal measurement and/or timing of a secondary cell group (SCG) and/or a primary SCG cell (PSCell) of the SCG when the SCG is in a deactivated state;

reconfiguring the signal measurement and/or timing according to first information if the first information is acquired;

where the first information indicates a communication status between the terminal and the PSCell related to the signal measurement and/or the timing, or, the first information is instruction information of a network device received by the terminal.

In a third aspect, the present application provides a communication apparatus in a deactivated state of a secondary cell group (SCG), applied to a terminal, including:

an acquiring unit, configured to determine signal measurement and/or timing of the SCG and/or a primary SCG cell (PSCell) of the SCG when the SCG is in the deactivated state;

a configuring unit, configured to reconfigure the signal measurement and/or the timing according to first information if the first information is acquired;

where the first information indicates a communication status between the terminal and the PSCell related to the signal measurement and/or the timing, or, the first information is instruction information of a network device received by the terminal.

In an embodiment, the signal measurement includes beam failure detection of the PSCell, and the first information indicates that the terminal detects a beam failure of the PSCell.

In an embodiment, the configuring unit is specifically configured to:

if the signal measurement further includes one or more of the following of the PSCell: beam failure recovery, sounding reference signal (SRS) transmission, channel state information reference signal (CSI-RS) measurement and/or reporting, radio resource management (RRM) measurement based on SCG measurement configuration, radio link monitoring (RLM) measurement, and/or, the timing includes uplink timing advance timer (TAT) operation of the PSCell, stop one or more executions of the signal measurement and/or the timing according to the first information; and/or, if the signal measurement further includes one or more of the following of the SCG: beam failure recovery, beam failure detection, SRS transmission, CSI-RS measurement and/or reporting, RRM measurement based on SCG measurement configuration, RLM measurement, and/or, the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG, according to the first information.

In an embodiment, the timing includes uplink TAT operation of the PSCell, and the first information indicates that the uplink TAT of the PSCell expires.

In an embodiment, the configuring unit is specifically configured to:

if the signal measurement includes one or more of the following of the primary SCG cell (PSCell): beam failure detection, beam failure recovery, SRS transmission, CSI-RS measurement and/or reporting, RRM measurement based on SCG measurement configuration, RLM measurement, stop one or more executions of the signal measurement and/or the timing according to the first information; and/or, if the signal measurement includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG, according to the first information.

In an embodiment, the signal measurement further includes one or more of the following: RRM measurement for the SCG, RLM measurement for the PSCell, CSI-RS measurement for the SCG and/or the PSCell; the configuring unit is specifically configured to:

for one or more of the signal measurement, if a measurement cycle of the signal measurement is a first cycle, switch the measurement cycle of the signal measurement from the first cycle to a second cycle according to the first information; or for one or more of the signal measurement, if the measurement cycle of the signal measurement is a second cycle, switch the measurement cycle of the signal measurement from the second cycle to a first cycle according to the first information;

where the first cycle is greater than the second cycle.

In an embodiment, the signal measurement includes beam failure recovery of the PSCell, and the first information indicates that the terminal completes the beam failure recovery for the PSCell successfully; and/or, the timing includes uplink TAT operation of the PSCell, and the first information indicates that the terminal restarts an uplink TAT for the PSCell.

In an embodiment, the signal measurement further includes one or more of the following: RRM measurement for the SCG, RLM measurement for the PSCell, CSI-RS measurement for the SCG and/or the PSCell;

the configuring unit is specifically configured to:

for one or more of the signal measurement, if a measurement cycle of the signal measurement is a second cycle, switch the measurement cycle of the signal measurement from the second cycle to a first cycle according to the first information; or for one or more of the signal measurement, if the measurement cycle of the signal measurement is a first cycle, switch the measurement cycle of the signal measurement from the first cycle to a second cycle according to the first information;

where the first cycle is greater than the second cycle.

In an embodiment, the signal measurement includes RLM measurement of the PSCell, and the first information indicates that the terminal detects that a radio link failure occurs in the PSCell.

In an embodiment, the configuring unit is specifically configured to:

if the signal measurement further includes one or more of the following of the PSCell: beam failure detection, beam failure recovery, SRS transmission, CSI-RS measurement and/or reporting, RRM measurement based on SCG measurement configuration, and/or the timing includes uplink TAT operation of PSCell, stop one or more executions of the signal measurement and/or the timing according to the first information; and/or, if the signal measurement further includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG, according to the first information.

In an embodiment, the signal measurement includes one or more of the following: RRM measurement for the SCG, RLM measurement for the PSCell, CSI-RS measurement for the SCG and/or the PSCell, and the first information indicates that a timer of one or more of the signal measurement expires; the configuring unit is specifically configured to:

if a measurement cycle of the signal measurement which expires is a second cycle, switch the measurement cycle of the signal measurement which expires from the second cycle to a first cycle according to the first information: or, if a measurement cycle of the signal measurement which expires is a first cycle, switch the measurement cycle of the signal measurement which expires from the first cycle to a second cycle according to the first information;

where the first cycle is greater than the second cycle.

In an embodiment, the signal measurement includes one or more of the following: RRM measurement for the SCG, RLM measurement for the PSCell, CSI-RS measurement for the SCG and/or the PSCell, the first information is instruction information related to one or more of the signal measurement received by the terminal and sent by the network device; the configuring unit is specifically configured to:

for the one or more of the signal measurement indicated by the first information, if a measurement cycle of the signal measurement is a second cycle, switch the measurement cycle of the signal measurement from the second cycle to a first cycle according to the first information; or for the one or more of the signal measurement indicated by the first information, if a measurement cycle of the signal measurement is the first cycle, switch the measurement cycle of the signal measurement from the first cycle to a second cycle according to the first information;

where the first cycle is greater than the second cycle.

In a fourth aspect, the present application provides a processor-readable storage medium, where the processor-readable storage medium stores a computer program which is used to cause a processor to perform the method according to the first aspect.

In a fifth aspect, the present application provides a computer program product, where the computer program product includes a computer program which when executed by a processor, implements the method according to the first aspect.

In a sixth aspect, the present application provides a communication system, including a network device and a terminal according to the second aspect.

The present application provides a communication method and apparatus, and a device and a medium in a deactivated state of a secondary cell group. The solution of the present application is applied to a terminal, and includes: determining signal measurement and/or timing of the secondary cell group (SCG) and/or a primary SCG cell (PSCell) of the SCG when the SCG is in the deactivated state; reconfiguring the signal measurement and/or the timing according to first information if the first information is acquired; where the first information indicates a communication status between the terminal and the PSCell related to the signal measurement and/or the timing, or, the first information is instruction information of a network device received by the terminal. Therefore, when the SCG is in the deactivated state, the terminal is triggered to adjust its signal measurement and/or timing for the SCG and/or the PSCell in the SCG based on the communication status related to the signal measurement and/or the timing of the SCG and/or the PSCell in the SCG, or based on the instruction of the network device, to improve the rationality of the behavior configuration of the terminal side in the SCG deactivated state.

Other features of the present application will be easily understood by the following description.

BRIEF DESCRIPTION OF DRAWINGS

In order to illustrate the embodiments in the present application more clearly, the following will be a brief introduction to the drawings required in the embodiments. The drawings described below are some embodiments of the present application.

DESCRIPTION OF EMBODIMENTS

Figure 1:
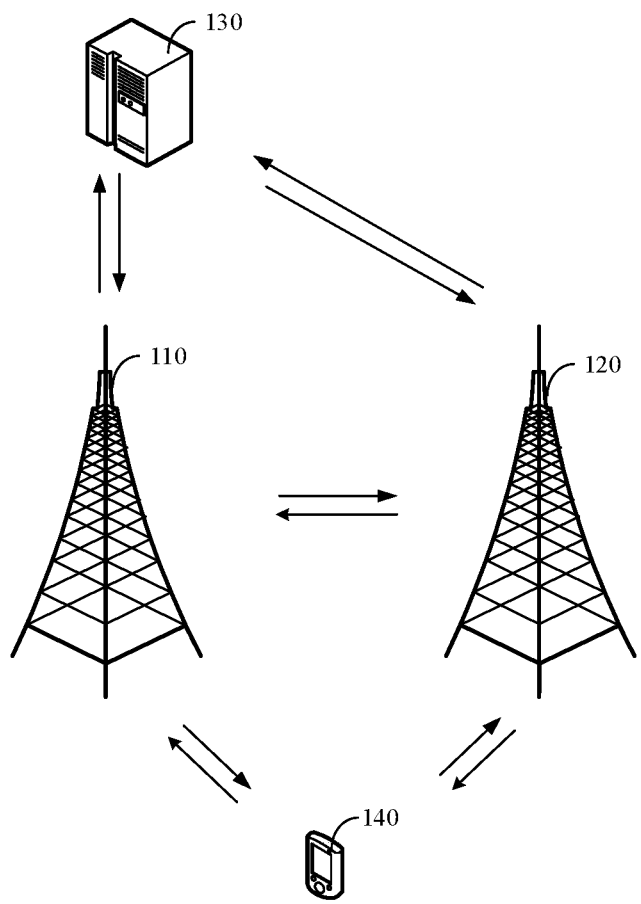
FIG. 1 is an example diagram of an application scenario provided by an embodiment of the present application.

The term "and/or" in the present application describes the association relationships of the associated objects, and indicates that there may be three relationships, for example, A and/or B may indicate three cases: the existence of A alone, the existence of A and B at the same time, the existence of B alone. The character "I" generally indicates that the associated objects are in an OR relationship.

The following will describe the embodiments in the embodiments of the present application clearly and completely with reference to the accompanying drawings in the embodiments of the present application. The described embodiments are only a part of the embodiments of the present application, rather than all the embodiments.

The embodiments of the present application may be applied to a variety of systems, especially 5G systems. For example, the applicable systems may be a global system of mobile communication (global system of mobile communication, GSM) system, a code division multiple access (code division multiple access, CDMA) system, a wideband code division multiple access (wideband code division multiple access, WCDMA) general packet radio service (GPRS) system, a long term evolution (long term evolution, LTE) system, an LTE frequency division duplex (frequency division duplex, FDD) system, LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, a 5G new radio (New Radio, NR) system, etc. All these systems include terminals and network devices. The system may also include a core network part, such as an evolved packet system (Evolved Packet System, EPS), a 5G system (5GS), etc.

The terminal involved in the embodiments of the present application may be a device that provides voice and/or data connectivity to a user, a handheld device with a wireless connection function, or other processing devices connected to a wireless modem. In different systems, the name of the terminal may be different. For example, in a 5G system, the terminal may be called user equipment (User Equipment, UE). The wireless terminal can communicate with one or more core networks (Core Networks, CNs) via a radio access network (Radio Access Network, RAN), and the wireless terminal may be a mobile terminal, such as a mobile phone (or called a "cellular" phone) and a computer with a mobile terminal, such as a portable, pocket, hand-held, built-in computer, or vehicle-mounted mobile device, which exchanges voice and/or data with the radio access network. For example, a personal communication service (Personal Communication Service, PCS) phone, a cordless phone, a session initiated protocol (Session Initiated Protocol, SIP) phone, a wireless local loop (Wireless Local Loop, WLL) station, a personal digital assistant (Personal Digital Assistant, PDA) and other devices. The wireless terminal may also be called a system, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent) and a user device (user device), which is not limited in the embodiments of the present application.

The network device involved in the embodiments of the present application may be a base station, and the base station may include multiple cells that provide services for terminals. Depending on different specific application scenarios, the base station may also be called an access point, or may be a device in an access network that communicates with a wireless terminal through one or more sectors on the air interface, or by other names. The network device can be used to interchange received over-the-air frames with Internet Protocol (Internet Protocol, IP) packets and act as a router between the wireless terminal and the rest of the access network, which may include an Internet Protocol (IP) communication network. The network device may also coordinate attribute management for the air interface. For example, the network device involved in the embodiments of the present application may be a network device (Base Transceiver Station, BTS) in a global system for mobile communications (Global System for Mobile communications, GSM) or code division multiple access (Code Division Multiple Access, CDMA), or a network device (NodeB) in wide-band code division multiple access (Wide-band Code Division Multiple Access, WCDMA), or an evolved network device (evolutional Node B, eNB or e-NodeB) in a long term evolution (long term evolution, LTE) system, a 5G base station (gNB) in a 5G network architecture (next generation system), and may also be a home evolved base station (Home evolved Node B, HeNB), a relay node (relay node), a home base station (femto), a pico base station (pico), etc., which is not limited in the embodiments of the present application. In some network structures, a network device may include a centralized unit (centralized unit, CU) node and a distributed unit (distributed unit, DU) node, and the centralized unit and the distributed unit may also be arranged geographically separately.

The network device and the terminal may use one or more antennas respectively for multi input multi output (Multi Input Multi Output, MIMO) transmission. The MIMO transmission may be single user MIMO (Single User MIMO, SU-MIMO) or multiple user MIMO (Multiple User MIMO, MU-MIMO). According to the shape and number of root antenna combinations, the MIMO transmission may be 2D-MIMO, 3D-MIMO, FD-MIMO, or massive-MIMO, or may be diversity transmission, precoding transmission, or beamforming transmission, etc.

Dual connectivity (DC) architecture: a network architecture in which a terminal in a connected state maintains connection and communication with two different access network devices at the same time, and can utilize radio resources of two different access network devices, one of the two different access network devices is a master node (Master Node, Main Node or Primary Node, MN or PN), and the other is a secondary node (Secondary Node, SN), and the MN and the SN are connected to the same core network device. Compared with the SN, the MN can provide the signaling control function to accessing the network. The cell group on the MN side is a master cell group (Master Cell Group, Main Cell Group, or Primary Cell Group, MCG or PCG), and the MCG includes a primary cell (Primary Cell, PCell) and zero to multiple secondary cells (Secondary Cells, SCells). The cell group on the SN side is a secondary cell group (Secondary Cell Group, SCG), and the SCG includes a primary SCG cell (Primary SCG Cell, PSCell) and zero to multiple secondary cells (SCell).

The PCell is a cell initially accessed by the terminal on the MN side, and the PCell and the SCell in the MCG operate on different carriers and operate jointly through carrier aggregation (Carrier aggregation, CA) technology. Similarly, the PSCell is a cell initially accessed by the terminal on the SN side. The PSCell and the SCell in the SCG operate on different carriers and operate jointly through the CA technology.

In the communication system to which the embodiments of the present application is applicable, the network architecture employs multi-connectivity architecture, and in the multi-connectivity architecture, a terminal in a connected state can maintain communication with at least two different access network devices at the same time. The at least two different access network devices which are connected to the terminal at the same time are divided into one MN and one or more secondary nodes (Secondary Nodes, SNs).

FIG. 1 takes the DC architecture as an example of the multi-connectivity architecture, showing an example diagram of an application scenario to which the embodiments of the present application are applicable. As shown in FIG. 1, in the application scenario, the communication system includes a network device and a terminal 140, the network device may include a core network device 130, a radio access network device 110 serving as an MN and a radio access network device 120 serving as an SN, and the MN and SN are connected to the same core network device 130 in a wired or wireless manner. The terminal 140 is connected to the MN and the SN simultaneously in a wireless manner.

The core network device and the radio access network devices in the application scenario may be different and independent physical devices, or it is also possible to integrate functions of the core network device and logical functions of the radio access network devices into a same physical device, or it is also possible to integrate some functions of the core network device and some functions of the radio access network devices into a physical device. The terminal may be fixed or mobile. FIG. 1 is only a schematic diagram, the communication system may also include other network devices, for example, may also include a wireless repeater device and a wireless backhaul device, which are not shown in FIG. 1.

In the SCG deactivated state on the SN side, the terminal does not perform data transmission with the SCG. The terminal does not need to monitor a physical downlink control channel (Physical Downlink Control Channel, PDCCH) for the SCG. However, in the SCG deactivated state, it is not clear how to execute most terminal behaviors between the terminal and the SCG, such as beam failure detection (Beam Failure Detection, BFD), beam failure recovery (Beam Failure Recovery, BFR), channel state information-reference signal (Channel State Information-Reference Signal, CSI-RS), sounding reference signal (Sounding Reference Signal, SRS) transmission, radio resource management (Radio Resource Management, RRM) measurement, radio link monitoring (Radio Link Monitoring, RLM) measurement, timing advance timer (Timing Advance Timer, TAT) operation, and other terminal behaviors.

In order to solve the above problem, embodiments of the present application provide a communication method and apparatus, and a device and a medium in a deactivated state of a secondary cell group. The communication method in the deactivated state of the secondary cell group provided by the embodiments of the present application is applied to the terminal side. In the method, the signal measurement and/or timing of an SCG and/or for a PSCell in the SCG is determined when the SCG is in a deactivated state, and if first information is acquired, the signal measurement and/or the timing of the terminal is reconfigured according to the first information, to trigger the terminal to adjust its signal measurement and/or timing for the SCG and/or the PSCell, and improving the flexibility and rationality of the behavior configuration of the terminal side in the SCG deactivated state.

The method and apparatus provided in the embodiments of the present application are based on the same application concept, and because the method and the apparatus solve the problem with the similar principle, reference may be made to the implementation of the apparatus and the method for each other, and the repetition will not be repeated.

Figure 2:
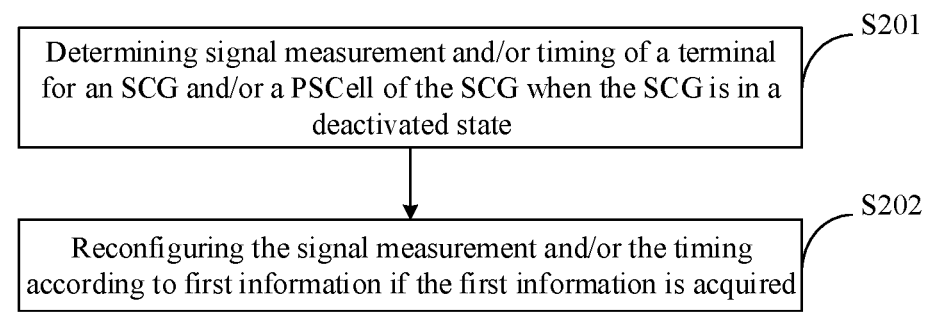
FIG. 2 is a schematic flow diagram of a communication method in a deactivated state of a secondary cell group provided by an embodiment of the present application.

FIG. 2 is a schematic flow diagram of a communication method in a deactivated state of a secondary cell group provided by an embodiment of the present application, and as shown in FIG. 2, the method of the present embodiment may include:

S201: determining signal measurement and/or timing of a terminal for the SCG and/or a PSCell of the SCG when the SCG is in the deactivated state.

The signal measurement is for example, RRM measurement, RLM measurements, etc., and the timing is for example uplink TAT timing.

Since the SCG includes one PSCell and zero to multiple SCells, the signal measurement and/or the timing of the SCG may include: the signal measurement and/or the timing of the PSCell in the SCG, and/or, the signal measurement and/or the timing of one or more SCells in the SCG.

In the present embodiment, when the SCG is in the deactivated state, the communication data transmission between the terminal and the SCG stops, but this does not mean that the signal measurement and/or timing between the terminal and the SCG stops, so according to its own communication parameter, the terminal may determine its own signal measurement and/or timing for the SCG, and/or only determine its own signal measurement and/or timing for the PSCell in the SCG. Here, determining the signal measurement and/or timing of the SCG includes: determining the signal measurement and/or the timing of the PSCell in the SCG, and determining the signal measurement and/or the timing of one or more SCells in the SCG.

For example, if periodic RRM measurement and SRS transmission for the SCG have been preconfigured on the terminal side, the signal measurement of the SCG includes the RRM measurement and the SRS transmission.

S202: reconfiguring the signal measurement and/or the timing according to first information if the first information is acquired.

The first information indicates a communication status between the terminal and the PSCell related to the signal measurement and/or the timing. In other words, the first information reflects the communication status between the terminal and the PSCell, and the communication status is related to the signal measurement and/or the timing determined in S201. In one embodiment, the first information is instruction information of a network device received by the terminal, which instructs the terminal to reconfigure the signal measurement and/or the timing for the SCG and/or for the PSCell in the SCG.

In the present embodiment, the communication status between the terminal and the PSCell may be obtained based on the signal measurement and/or the timing of the PSCell. For example, the status of the radio link between the terminal and the PSCell is obtained based on the RLM measurement of the PSCell, and the channel status between the terminal and the PSCell is obtained based on the CSI-RS measurement of the PSCell.

In the present embodiment, when the SCG is in the deactivated state, if the terminal acquires the first information indicating the communication status between the terminal and the PSCell, the signal measurement and/or the timing may be reconfigured according to the first information, so that the reconfigured signal measurement and/or timing is more suitable for the communication between the terminal and the SCG in the deactivated state.

In an embodiment of the present application, when the SCG is in the deactivated state, the signal measurement and/or the timing on the terminal side is reconfigured according to the first information which is associated with the signal measurement and/or the timing of the SCG and/or the PSCell in the SCG and which indicates the communication status between the terminal and the PSCell, or according to the instruction information of the network device received by the terminal, so that when the SCG is in the deactivated state, the terminal is triggered to adjust the signal measurement and/or the timing for the SCG or the PSCell, to improve the flexibility and rationality of the behavior configuration of the terminal side in the SCG deactivated state.

In some embodiments, the signal measurement on the terminal side includes beam failure detection of the PSCell, and the first information indicates that the terminal detects a beam failure of the PSCell, and thus, the signal measurement and/or the timing of the SCG and/or the PSCell is reconfigured when the terminal detects the beam failure of the PSCell. The terminal detecting the beam failure of the PSCell indicates that the PSCell has poor beam quality, poor channel status, etc. The beam failure of the PSCell has a great impact on the communication between the terminal and the SCG, and adjusting the signal measurement and/or the timing of the SCG and/or the PSCell when the terminal detects the beam failure of the PSCell, is conducive to improving the rationality of the behavior on the terminal device side in the SCG deactivated state.

Figure 3:
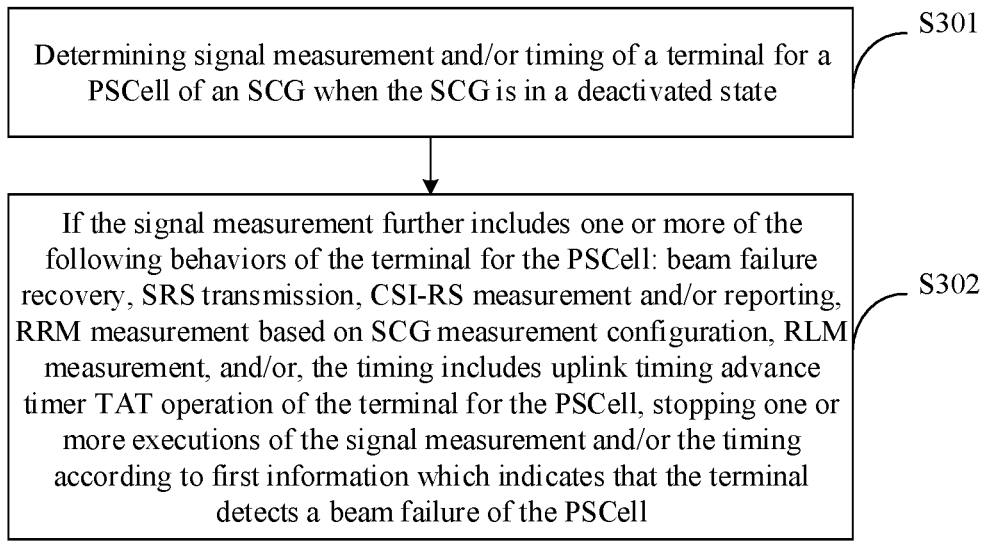
FIG. 3 is a schematic flow diagram of a communication method in a deactivated state of a secondary cell group provided by another embodiment of the present application.

Based on that the signal measurement on the terminal side includes beam failure detection of the PSCell, and the first information indicates that the terminal detects a beam failure of the PSCell, FIG. 3 shows a schematic flow diagram of a communication method in a deactivated state of a secondary cell group provided by another embodiment of the present application. As shown in FIG. 3, the method of the present embodiment may include:

S301: determining signal measurement and/or timing of a terminal for a PSCell of an SCG when the SCG is in a deactivated state.

For the implementation process of S301, reference may be made to the description of the preceding embodiments, which will not be repeated.

S302: if the signal measurement further includes one or more of the following behaviors of the PSCell: beam failure recovery, SRS transmission, CSI-RS measurement and/or reporting, RRM measurement based on SCG measurement configuration, RLM measurement, and/or, the timing includes uplink timing advance timer TAT operation of the PSCell, stopping one or more executions of the signal measurement and/or timing according to first information which indicates that the terminal detects a beam failure of the PSCell.

In a multi-connectivity scenario, the RRM measurement between the terminal and the network side includes RRM measurement based on MCG measurement configuration and RRM measurement based on SCG measurement configuration, and when the SCG is in the deactivated state, the RRM measurement based on the MCG measurement configuration is determined to be performed on the terminal side, while whether the RRM measurement based on the SCG measurement configuration will be performed or not is not clear.

The RRM measurement based on the SCG measurement configuration refers to the RRM measurement performed by the terminal based on the measurement configuration sent to the terminal from the SN side.

In the present embodiment, the signal measurement of the PSCell includes beam failure detection, then the terminal may detect the first information through beam failure detection, that is, the beam failure of the PSCell is detected. The beam failure of the PSCell has a great impact on the communication between the terminal and the SCG, and when the terminal detects the beam failure of the PSCell, the terminal may need to disconnect from the PSCell and re-establish the connection with the PSCell. In such a communication environment with a beam failure of the PSCell, if the terminal further performs, for the PSCell, beam failure recovery, TAT operation, SRS transmission, CSI-RS measurement and/or reporting, RRM measurement based on SCG measurement configuration, RLM measurement, the performing of the signal measurement and/or the timing is not that necessary. Therefore, in order to reduce the power consumption of the terminal in the SCG deactivated state, the one or more executions of the signal measurement and/or the timing may be stopped on the terminal side. For example, the beam failure recovery, TAT operation, etc. of the PSCell is stopped.

In the embodiment of the present application, when the terminal performs, for the PSCell in the SCG, one or more of beam failure detection, beam failure recovery, SRS transmission, CSI-RS measurement and/or reporting, RRM measurement based on SCG measurement configuration, RLM measurement, TAT operation, if the terminal detects a beam failure of the PSCell, one or more executions of the signal measurement and/or the timing is stopped on the terminal side, to reduce the power consumption of the terminal side in the SCG deactivated state, and improving the flexibility and rationality of the behavior configuration of the terminal side in the SCG deactivated state.

Figure 4:
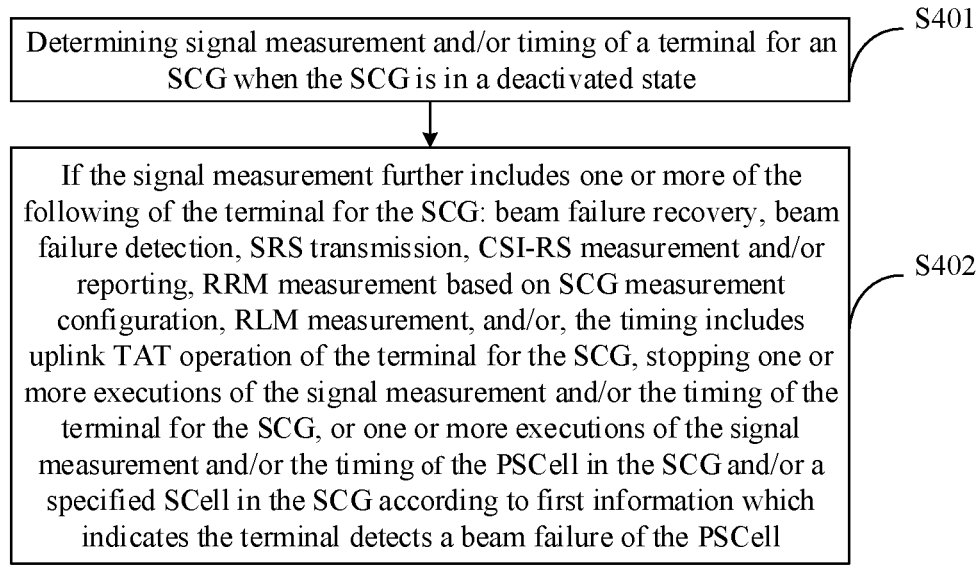
FIG. 4 is a schematic flow diagram of a communication method in a deactivated state of a secondary cell group provided by another embodiment of the present application.

Considering that the SCG may include one or more SCells in addition to the PSCell, thus in the case of the SCG including the PSCell and one or more SCells, based on that the signal measurement on the terminal side includes beam failure detection of the PSCell and the first information indicates that the terminal detects a beam failure of the PSCell, FIG. 4 shows a schematic flow diagram of a communication method in a deactivated state of a secondary cell group provided by another embodiment of the present application. As shown in FIG. 4, the method of the present embodiment may include:

S401: determining signal measurement and/or timing of a terminal for an SCG when the SCG is in a deactivated state.

For the implementation process of S401, reference may be made to the description of the preceding embodiments, which will not be repeated.

S402: if the signal measurement further includes one or more of the following of the SCG: beam failure recovery, beam failure detection, SRS transmission, CSI-RS measurement and/or reporting, RRM measurement based on SCG measurement configuration, RLM measurement, and/or, the timing includes uplink TAT operation of the SCG, stopping one or more executions of the signal measurement and/or the timing of the SCG, or one or more executions of the signal measurement and/or the timing of the PSCell in the SCG and/or a specified SCell in the SCG, according to first information which indicates that the terminal detects a beam failure of the PSCell.

That the signal measurement further includes one or more of the following behaviors of the SCG: beam failure recovery, beam failure detection, SRS transmission, CSI-RS measurement and/or reporting, RRM measurement based on SCG measurement configuration, RLM measurement includes the following cases:

(1) The signal measurement further includes one or more of the following behaviors of the PSCell in the SCG: beam failure recovery, SRS transmission, CSI-RS measurement and/or reporting, RRM measurement based on SCG measurement configuration, RLM measurement;

(2) The signal measurement further includes one or more of the following behaviors of one or more SCells in the SCG: beam failure detection, beam failure recovery, SRS transmission, CSI-RS measurement and/or reporting, RRM measurement based on SCG measurement configuration, RLM measurement;

(3) The signal measurement further includes both cases (1) and (2).

In the present embodiment, the signal measurement of the SCG includes beam failure detection of the PSCell, and therefore, the terminal may detect to obtain the first information through beam failure detection for the PSCell, that is, the beam failure of the PSCell is detected. In the case of the beam failure of the PSCell, if the signal measurement of the SCG further include one or more of the following: beam failure recovery, beam failure detection, SRS transmission, CSI-RS measurement and/or reporting, RRM measurement based on SCG measurement configuration, RLM measurement, and/or, the timing of the terminal side includes uplink TAT operation of the SCG, these signal measurement and/or timing are not that necessary to be performed and the terminal may stop one or more executions of the signal measurement and/or the timing to reduce the power consumption of the terminal in the SCG deactivated state, to improve the rationality of the behavior configuration of the terminal side.

In the present embodiment, the terminal stops one or more executions of the signal measurement and/or the timing, which includes the terminal stops one or more executions of the signal measurement and/or timing of the SCG, that is, the terminal stops one or more executions of the signal measurement and/or the timing of the PSCell in the SCG and/or SCell(s) in the SCG. In one embodiment, the terminal stopping one or more executions of the signal measurements and/or the timing includes the terminal stops one or more executions of the signal measurement and/or the timing of the PSCell in the SCG and/or a specified SCell in the SCG.

The specified SCell in the SCG may refer to a SCell in the SCG that is not in the dormant state (dormant). Therefore, when the signal measurement and/or the timing of the SCell in the SCG is reconfigured according to the first information, the reconfiguration may be performed only for the signal measurement and/or the timing for the specified SCell in the SCG.

In the embodiment of the present application, if the signal measurement of the SCG includes one or more of the following: beam failure detection, beam failure recovery, SRS transmission, CSI-RS measurement and/or reporting, RRM measurement based on SCG measurement configuration, RLM measurement, and/or, the timing on the terminal side includes uplink TAT operation of the SCG, then when the terminal detects a beam failure of the PSCell in the SCG, the terminal stops one or more executions of the signal measurement and/or the timing of the SCG, or one or more executions of the signal measurement and/or the timing of the PSCell in the SCG and/or the specified SCell in the SCG, to reduce the power consumption of the terminal side in the SCG deactivated state and improving the flexibility and rationality of behavior configuration of the terminal side.

In some embodiments, the timing of the terminal side includes uplink TAT operation of the PSCell, and the first information indicates that the terminal detects the uplink TAT for the PSCell expires, and thus the signal measurement and/or the timing of the SCG and/or the PSCell is reconfigured in the case that the terminal detects the uplink TAT for the PSCell expires. The terminal detects the expiration of the uplink TAT for the PSCell through the uplink TAT operation for the PSCell, and in the case that the uplink TAT for the PSCell expires, errors may occur in uplink and downlink signal transmission between the terminal and the PSCell, and at this time, reconfiguring the signal measurement and/or the timing of the SCG and/or the PSCell is conducive to improving the rationality of the signal measurement and/or the timing of the terminal device side in the SCG deactivated state.

Figure 5:
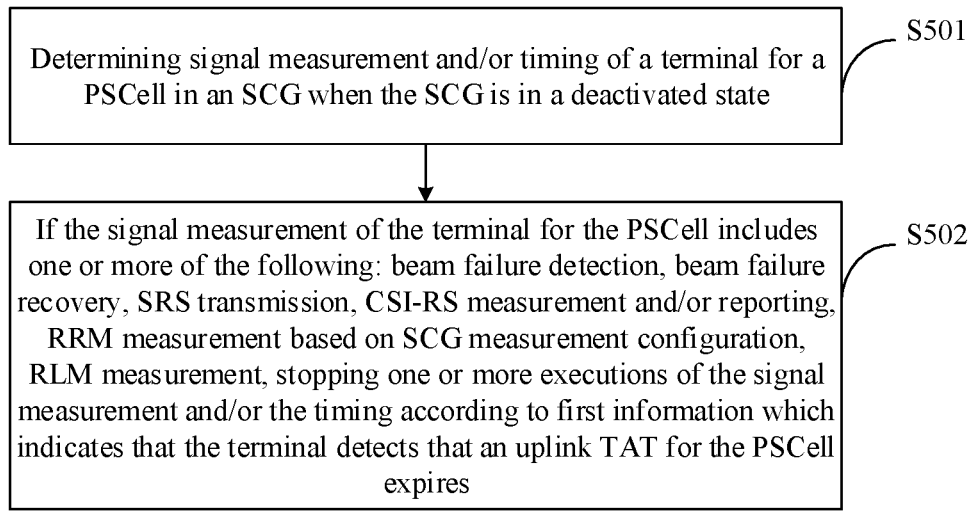
FIG. 5 is a schematic flow diagram of a communication method in a deactivated state of a secondary cell group provided by another embodiment of the present application.

Based on that the timing of the terminal side includes uplink TAT operation of the PSCell, the first information indicates that the terminal detects the uplink TAT for the PSCell expires, FIG. 5 shows a schematic flow diagram of a communication method in a deactivated state of a secondary cell group provided by another embodiment of the present application. As shown in FIG. 5, the method of the present embodiment may include:

S501: determining signal measurement and/or timing of a terminal for a PSCell in an SCG when the SCG is in a deactivated state.

For the implementation process of S501, reference may be made to the description of the preceding embodiments, which will not be repeated.

S502: if the signal measurement of the PSCell includes one or more of the following: beam failure detection, beam failure recovery, SRS transmission, CSI-RS measurement and/or reporting, RRM measurement based on SCG measurement configuration, RLM measurement, stopping one or more executions of the signal measurement and/or the timing according to the first information which indicates that the terminal detects that an uplink TAT for the PSCell expires.

In the present embodiment, the terminal detects the expiration of the uplink TAT for the PSCell through the uplink TAT operation for the PSCell. When the uplink TAT for the PSCell expires, and if the signal measurement of the terminal side further includes one or more of the following behaviors of the PSCell: beam failure detection, beam failure recovery, SRS transmission, CSI-RS measurement and/or reporting, RRM measurement based on SCG measurement configuration, RLM measurement, then these signal measurement and/or timing are not that necessary to be performed. Therefore, one or more executions of the signal measurement and/or the timing can be stopped on the terminal side in order to reduce the power consumption in the SCG deactivated state.

In an embodiment of the present application, when the timing of the terminal side includes uplink TAT operation of the PSCell in the SCG, and the signal measurement on the terminal side includes one or more of the following of the PSCell in the SCG: beam failure detection, beam failure recovery, SRS transmission, CSI-RS measurement and/or reporting, RRM measurement based on SCG measurement configuration, RLM measurements, the terminal detects that the uplink TAT for the PSCell expires when the uplink TAT operates, then the one or more executions of the signal measurement and/or the timing is stopped on the terminal side, to reduce the power consumption of the terminal side in the SCG deactivated state and improving the flexibility and rationality of behavior configuration of the terminal side in the SCG deactivated state.

Figure 6:
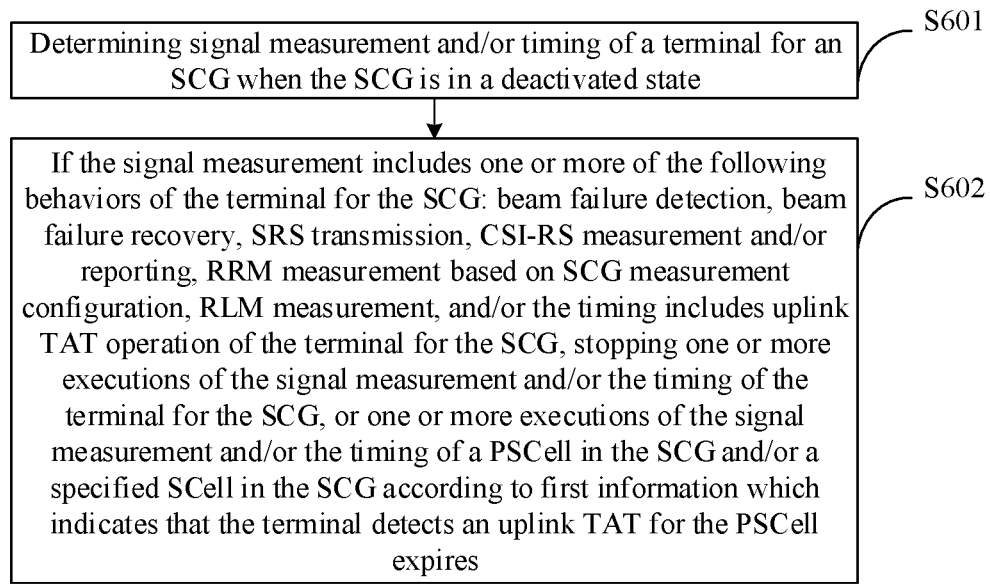
FIG. 6 is a schematic flow diagram of a communication method in a deactivated state of a secondary cell group provided by another embodiment of the present application.

Considering that the SCG may include one or more SCells in addition to the PSCell, in the case that the SCG includes the PSCell and one or more SCells, based on that the timing of the terminal side includes operating an uplink TAT of the PSCell, and the first information indicates that the terminal detects that the uplink TAT for the PSCell expires, FIG. 6 shows a schematic flow diagram of a communication method in a deactivated state of a secondary cell group provided by another embodiment of the present application. As shown in FIG. 6, the method of the present embodiment may include:

S601: determining signal measurement and/or timing of a terminal for an SCG when the SCG is in a deactivated state.

For the implementation process of S601, reference may be made to the description of the preceding embodiments, which will not be repeated.

S602: if the signal measurement includes one or more of the following behaviors of the SCG: beam failure detection, beam failure recovery, SRS transmission, CSI-RS measurement and/or reporting, RRM measurement based on SCG measurement configuration, RLM measurement, and/or the timing includes operating an uplink TAT of the SCG, stopping one or more executions of the signal measurement and/or the timing of the SCG, or one or more executions of the signal measurement and/or the timing of a PSCell in the SCG and/or a specified secondary cell SCell in the SCG according to the first information which indicates that the terminal detects the uplink TAT for the PSCell expires.

That the signal measurement includes one or more of the following behaviors of the SCG: beam failure detection, beam failure recovery, SRS transmission, CSI-RS measurement and/or reporting, RRM measurement based on SCG measurement configuration, RLM measurement, includes the following cases:

(1) Terminal behavior includes one or more of the following behaviors of the PSCell in SCG: beam failure detection, beam failure recovery, SRS transmission, CSI-RS measurement and/or reporting, RRM measurement based on SCG measurement configuration, RLM measurement;

(2) Terminal behavior includes one or more of the following behaviors of one or more SCells in the SCG: beam failure detection, beam failure recovery, SRS transmission, CSI-RS measurement and/or reporting, RRM measurement based on SCG measurement configuration, RLM measurement;

(3) Terminal behavior further includes both cases (1) and (2).

In the present embodiment, the terminal detects the expiration of the uplink TAT for the PSCell through the uplink TAT operation for the PSCell. When the uplink TAT for the PSCell expires, and if it is determined that the signal measurement of the terminal side further includes one or more of the following behaviors of the SCG: beam failure detection, beam failure recovery, SRS transmission, CSI-RS measurement and/or reporting, RRM measurement based on SCG measurement configuration, RLM measurement, and/or it is determined that the timing of the terminal side includes uplink TAT operation of the SCG, then these signal measurement and/or timing are not necessary to be performed, and the terminal may stop one or more executions of the signal measurement and/or the timing, in order to reduce the power consumption of the terminal in the SCG deactivated state, and improve the rationality of the behavior configuration of the terminal side.

In the present embodiment, that the terminal stops one or more executions of the signal measurement and/or the timing includes the terminal stops one or more executions of the signal measurement and/or the timing of the SCG, or the terminal stops one or more executions of the signal measurement and/or the timing of the PSCell in the SCG and/or a specified SCell in the SCG, and reference may be made to the description in the preceding embodiments, which will not be repeated.

In the embodiment of the present application, when it is determined that the timing of the terminal side includes uplink TAT operation of the PSCell in the SCG, and the signal measurement of the terminal side includes one or more of the following of the SCG: beam failure detection, beam failure recovery, SRS transmission, CSI-RS measurement and/or reporting, RRM measurement based on the SCG measurement configuration, RLM measurements, the terminal detects that the uplink TAT for the PSCell expires when the uplink TAT operates, then one or more of the signal measurement and/or the timing are stopped to be performed on the terminal side, to reduce the power consumption of the terminal side in the SCG deactivated state and improving the flexibility and rationality of behavior configuration of the terminal side in the SCG deactivated state.

In some embodiments, based on that the signal measurement of the terminal side includes beam failure detection of the PSCell, and the first information indicates that the terminal detects a beam failure of the PSCell, or, based on that the timing of the terminal side includes uplink TAT operation of the PSCell, and the first information indicates that the terminal detects that the uplink TAT for the PSCell expires, if the signal measurement of the terminal side further includes one or more of the following: RRM measurement for the SCG, RLM measurement for the PSCell, CSI-RS measurement for the SCG and/or the PSCell, the one or more of the signal measurement may be reconfigured, to improve the flexibility and rationality of behavior configuration of the terminal side in the SCG deactivated state.

Further, in the process of reconfiguring one or more of signal measurement of RRM measurement for the SCG, RLM measurement for the PSCell, CSI-RS measurement for the SCG and/or the PSCell, a measurement cycle of the one or more of signal measurement may be adjusted to improve the flexibility and rationality of the measurement cycle of the signal measurement in the SCG deactivated state.

Figure 7:
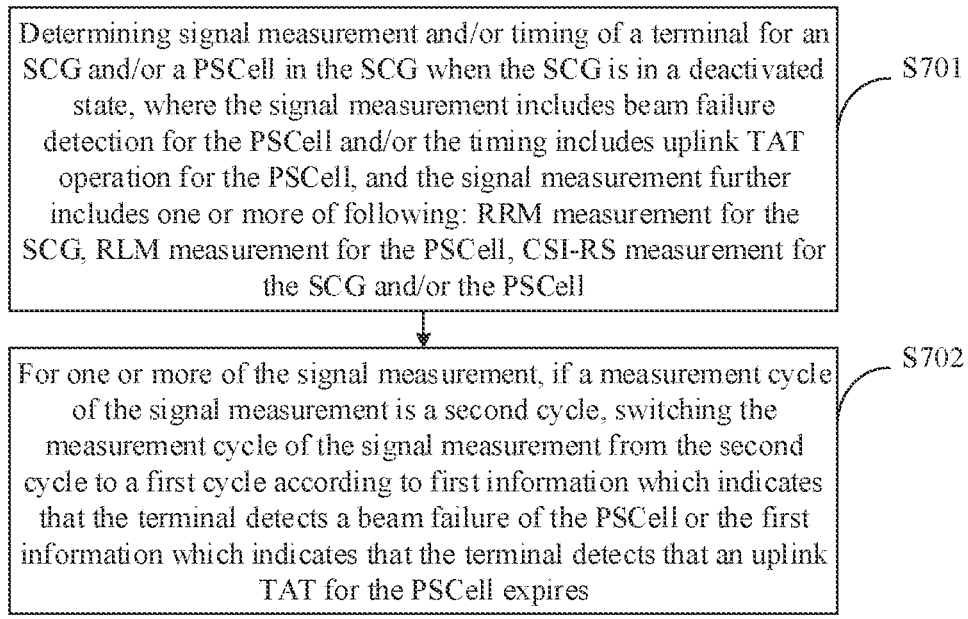
FIG. 7 is a schematic flow diagram of a communication method in a deactivated state of a secondary cell group provided by another embodiment of the present application.

Further, FIG. 7 shows a schematic flow diagram of a communication method in a deactivated state of a secondary cell group provided by another embodiment of the present application. As shown in FIG. 7, the method of the present embodiment may include:

S701: determining signal measurement and/or timing of a terminal for an SCG and/or a PSCell in the SCG when the SCG is in a deactivated state, where the signal measurement includes beam failure detection for the PSCell and/or the timing includes uplink TAT operation for the PSCell, and the signal measurement further includes one or more of the following: RRM measurement for the SCG, RLM measurement for the PSCell, CSI-RS measurement for the SCG and/or the PSCell.

The RRM measurement for the SCG includes the RRM measurement for the SCG based on the SCG measurement configuration. The CSI-RS measurement for the SCG includes the CSI-RS measurement for the PSCell and one or more SCells in the SCG.

For the implementation process of S701, reference may be made to the preceding embodiments, which will not be repeated.

S702: for one or more of the signal measurement, if a measurement cycle of the signal measurement is a second cycle, switching the measurement cycle of the signal measurement from the second cycle to a first cycle according to first information which indicates that the terminal detects a beam failure of the PSCell or the first information which indicates that the terminal detects that an uplink TAT for the PSCell expires.

If the signal measurement of the terminal side includes beam failure detection of the PSCell, the first information indicates that the terminal detects a beam failure of the PSCell. If the timing of the terminal side includes uplink TAT operation of PSCell, the first information indicates that the terminal detects an uplink TAT for the PSCell expires.

The first cycle is greater than the second cycle.

In the present embodiment, in the case that the terminal detects the beam failure of the PSCell and/or the expiration of the uplink TAT for the PSCell, it may be considered that the terminal is less necessary to perform RRM measurement for the SCG, RLM measurement for the PSCell, CSI-RS measurement for the SCG and/or the PSCell. Therefore, among the RRM measurement for the SCG, the RLM measurement for the PSCell, and the CSI-RS measurement for the SCG and/or the PSCell, by the terminal, for one or more of signal measurement, if the measurement cycle of the signal measurement is the second cycle, the measurement cycle of the signal measurement may be switched from the second cycle to the first cycle to increase the measurement cycle of the signal measurement and reduce the power consumption of the terminal.

In an embodiment, in the case that the terminal detects a beam failure of the PSCell and/or expiration of an uplink TAT for the PSCell, it may be necessary to accelerate the RRM measurement for the SCG, the RLM measurement for the PSCell, and the CSI-RS measurement for the SCG and/or the PSCell performed by the terminal to provide feedback on the communication status between the terminal and the PSCell as soon as possible, and recover the beam as soon as possible, or resolve the uplink TAT expiration as soon as possible. Therefore, among the RRM measurement for the SCG, the RLM measurement for the PSCell, the CSI-RS measurement for the SCG and/or the PSCell by the terminal, for one or more of signal measurement, if the measurement cycle of the signal measurement is the first cycle, the measurement cycle of the signal measurement may be switched from the first cycle to the second cycle to shorten the measurement cycle of the signal measurement and improve communication effect.

In the embodiment of the present application, in the case that the signal measurement of the SCG and/or the PSCell in the SCG includes beam failure detection for the PSCell, and/or the timing of the SCG and/or the PSCell in the SCG includes uplink TAT operation for the PSCell, if the terminal side further includes one or more of the signal measurement of RRM measurement for the SCG, RLM measurement for the PSCell, CSI-RS measurement for the SCG and/or the PSCell, the measurement cycle of one or more of the signal measurement is adjusted when the terminal detects a beam failure of the PSCell and/or expiration of the uplink TAT for the PSCell, so as to improve the flexibility and rationality of the behavior configuration of the terminal side in the SCG deactivated state.

In some embodiments, the signal measurement of the terminal side includes beam failure recovery of the PSCell, and the first information indicates that the terminal completes beam failure recovery for the PSCell successfully; and/or the timing of the terminal side includes uplink TAT operation of the PSCell, and the first information indicates that the terminal restarts an uplink TAT for the PSCell, so that the signal measurement and/or the timing of the SCG and/or the PSCell is reconfigured when the terminal completes the beam failure recovery for the PSCell and/or the terminal restarts the uplink TAT for the PSCell. The terminal completing the beam failure recovery for the PSCell successfully, and/or the terminal restarting the uplink TAT for the PSCell, indicates that the communication environment between the terminal and the SCG is restored, for example, the beam quality of the PSCell recovers, the channel state of the PSCell recovers, etc. At this this, the communication environment between the terminal and the SCG changes greatly, and the adjustment by the terminal to the signal measurement and/or the timing of the SCG and/or the PSCell is conducive to improving the rationality of signal measurement and/or timing on the terminal device side in the SCG deactivated state.

Further, the terminal behavior further includes one or more of signal measurement as follows: RRM measurement for the SCG, RLM measurement for the PSCell, CSI-RS measurement for the SCG and/or the PSCell, and thus one or more of signal measurement are reconfigured when the terminal successfully completes the beam failure recovery for the PSCell and/or the terminal restarts the uplink TAT for the PSCell, so as to improve the flexibility and rationality of the signal measurement configuration of the terminal side in the SCG deactivated state.

Further, in the process of reconfiguring one or more of signal measurement of the RRM measurement for the SCG, the RLM measurement for the PSCell, the CSI-RS measurement for the SCG and/or the PSCell, the measurement cycle of the one or more of signal measurement may be adjusted to improve the flexibility and rationality of the measurement cycle of signal measurement in the SCG deactivated state.

Figure 8:
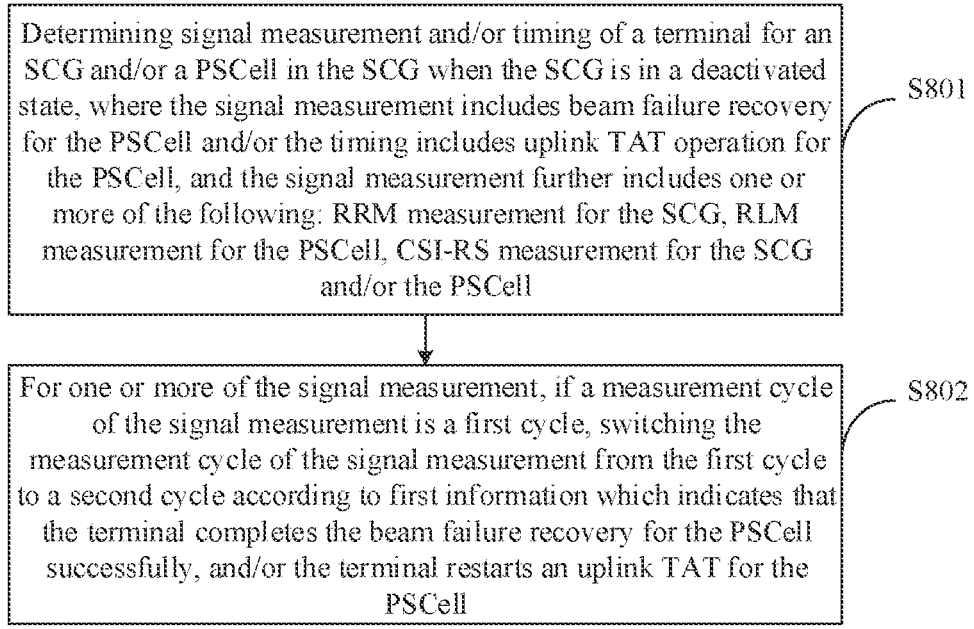
FIG. 8 is a schematic flow diagram of a communication method in a deactivated state of a secondary cell group provided by another embodiment of the present application.

FIG. 8 shows a schematic flow diagram of a communication method in a deactivated state of a secondary cell group provided by another embodiment of the present application. As shown in FIG. 8, the method of the present embodiment may include:

S801: determining signal measurement and/or timing of a terminal for an SCG and/or a PSCell in the SCG when the SCG is in a deactivated state, where the signal measurement includes beam failure recovery for the PSCell and/or the timing includes uplink TAT operation for the PSCell, and the signal measurement further includes one or more of the following: RRM measurement for the SCG, RLM measurement for the PSCell, CSI-RS measurement for the SCG and/or the PSCell.

For the implementation process of S801, reference may be made to the preceding embodiments, which will not be repeated.

S802: for one or more of signal measurement, if a measurement cycle of the signal measurement is a first cycle, switching the measurement cycle of the signal measurement from the first cycle to a second cycle according to first information which indicates that the terminal completes the beam failure recovery for the PSCell successfully, and/or the terminal restarts the uplink TAT for the PSCell.

If the signal measurement on the terminal side includes the beam failure recovery of the PSCell, then the first information indicates that the terminal completes the beam failure recovery for the PSCell successfully. If the timing on the terminal side includes the uplink TAT operation of the PSCell, then the first information indicates that the terminal restarts the uplink TAT for the PSCell.

The first cycle is greater than the second cycle.

In the present embodiment, in the case that the terminal completes the beam failure recovery for the PSCell successfully and/or the terminal restarts the uplink TAT for the PSCell, the communication environment between the terminal and the SCG returns to normal, and the RRM measurement for the SCG, the RLM measurement for the PSCell, and the CSI-RS measurement for the SCG and/or PSCell may be restored to the measurement with the normal cycle. Therefore, for one or more of signal measurement among the RRM measurement for the SCG, the RLM measurement for the PSCell, and the CSI-RS measurement for the SCG and/or the PSCell by the terminal, if the measurement cycle of the signal measurement is the first cycle, the measurement cycle of the signal measurement may be switched from the longer first cycle to the second cycle to restore the normal measurement cycle of the signal measurement.

In an embodiment, in the case that the terminal completes the beam failure recovery for the PSCell successfully and/or the terminal restarts the uplink TAT for the PSCell, since the communication environment between the terminal and the SCG returns to normal, it may be not necessary to perform the signal measurement in the SCG deactivated state in the normal cycle, and instead, a longer measurement cycle may be employed. Therefore, for one or more of signal measurement among the RRM measurement for the SCG, the RLM measurement for the PSCell and the CSI-RS measurement for the SCG and/or the PSCell by the terminal, if the measurement cycle of the signal measurement is the second cycle, the measurement cycle of the signal measurement may be switched from the second cycle to the first cycle to reduce the power consumption of the terminal in the SCG deactivated state.

In the embodiment of the present application, when the terminal performs beam failure recovery and/or uplink TAT operation for the PSCell in the SCG, and the signal measurement on the terminal side further includes one or more of the RRM measurement for the SCG, the RLM measurement for the PSCell, and the CSI-RS measurement for the SCG and/or the PSCell, if the terminal completes the beam failure recovery for the PSCell successfully and/or the terminal restarts the uplink TAT for PSCell, the measurement cycle of one or more of signal measurement is adjusted to improve the flexibility and rationality of the behavior configuration of the terminal side in the SCG deactivated state.

In some embodiments, the signal measurement on the terminal side includes RLM measurement of the PSCell, and the first information indicates that the terminal detects that a radio link failure occurs in the PSCell, so that the signal measurement and/or the timing of the SCG and/or the PSCell is reconfigured when the terminal detects that the radio link failure occurs in PSCell.

A radio link failure occurring in the PSCell indicates that the communication device of the PSCell has failed, which has a great impact on the communication environment between the terminal and the SCG, and at this time, the signal measurement and/or timing of the SCG and/or the PSCell is reconfigured, which is conducive to improving the flexibility and rationality of the behavior configuration of the terminal side in the SCG deactivated state.

Figure 9:
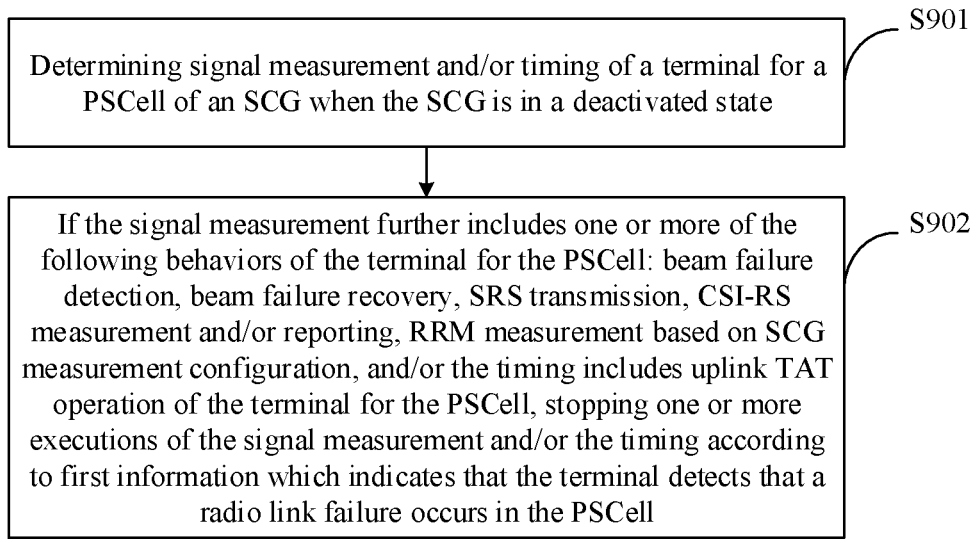
FIG. 9 is a schematic flow diagram of a communication method in a deactivated state of a secondary cell group provided by another embodiment of the present application.

Based on that the signal measurement of the terminal side includes RLM measurement of the PSCell, and the first information indicates that the terminal detects that a radio link failure occurs in the PSCell, FIG. 9 shows a schematic flow diagram of a communication method in a deactivated state of a secondary cell group provided by another embodiment of the present application. As shown in FIG. 9, the method of the present embodiment may include:

S901: determining signal measurement and/or timing of a terminal for a PSCell of an SCG when the SCG is in a deactivated state.

For the implementation process of S901, reference may be made to the description of the preceding embodiments, which will not be repeated.

S902: if the signal measurement further includes one or more of the following behaviors of the PSCell: beam failure detection, beam failure recovery, SRS transmission, CSI-RS measurement and/or reporting, RRM measurement based on SCG measurement configuration, and/or the timing includes uplink TAT operation of the PSCell, stopping one or more executions of the signal measurement and/or the timing according to first information which indicates that the terminal detects that a radio link failure occurs in the PSCell.

In the present embodiment, the signal measurement of the PSCell includes RLM measurement, then the terminal may detect the first information through the RLM measurement, that is, detect that a radio link failure occurs in the PSCell. When the terminal detects that a radio link failure occurs in the PSCell, if the terminal still performs one or more of the beam failure detection, the beam failure recovery, the SRS transmission, the CSI-RS measurement and/or reporting, the RRM measurement based on SCG measurement configuration, and the uplink TAT operation for the PSCell, these signal measurement and/or timing are not that necessary to be performed. Therefore, one or more of the signal measurement and/or the timing may be stopped to be performed on the terminal side in order to reduce the power consumption of the terminal in the SCG deactivated state.

In the embodiment of the present application, when the signal measurement of the PSCell in the SCG includes RLM detection, and the terminal further performs for the PSCell one or more of beam failure detection, beam failure recovery, TAT operation, SRS transmission, CSI-RS measurement and/or reporting, and the RRM measurement based on the SCG measurement configuration, if the terminal detects that a radio link failure occurs in the PSCell, one or more of the signal measurement and/or the timing are stopped on the terminal side, to reduce the power consumption of the terminal side in the SCG deactivated state and improving the flexibility and rationality of the behavior configuration of the terminal side in the SCG deactivated state.

Figure 10:
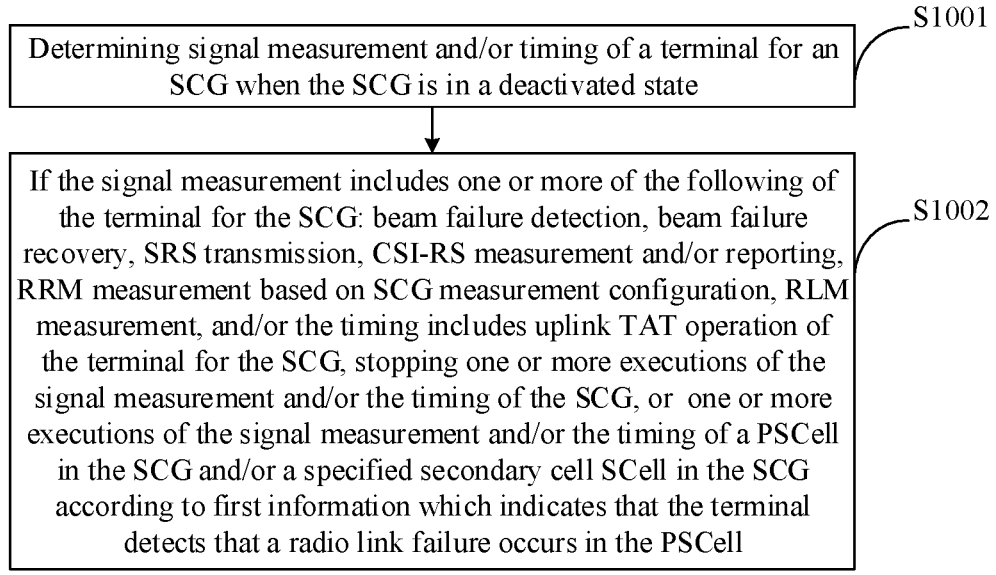
FIG. 10 is a schematic flow diagram of a communication method in a deactivated state of a secondary cell group provided by another embodiment of the present application.

Considering that the SCG may include one or more SCells in addition to the PSCell, in the case that the SCG includes the PSCell and one or more SCells, based on that the signal measurement on the terminal side includes RLM measurement of the PSCell, and the first information indicates that the terminal detects that a radio link failure occurs in the PSCell, FIG. 10 shows a schematic flow diagram of a communication method in a deactivated state of a secondary cell group provided by another embodiment of the present application. As shown in FIG. 10, the method of the present embodiment may include:

S1001: determining signal measurement and/or timing of a terminal for an SCG when the SCG is in a deactivated state.

For the implementation process of S1001, reference may be made to the description of the preceding embodiments, which will not be repeated.

S1002: if the signal measurement includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stopping one or more executions of the signal measurement and/or the timing of the SCG, or one or more executions of the signal measurement and/or the timing of a PSCell in the SCG and/or a specified secondary cell SCell in the SCG according to first information which indicates that the terminal detects that a radio link failure occurs in the PSCell.

The signal measurement further includes one or more of the following behaviors of the SCG: beam failure detection, beam failure recovery, uplink TAT operation, SRS transmission, CSI-RS measurement and/or reporting, RRM measurement based on SCG measurement configuration, RLM measurement, which includes the following cases:

(1) The signal measurement further includes one or more of the following behaviors of the PSCell in the SCG: beam failure detection, beam failure recovery, uplink TAT operation, SRS transmission, CSI-RS measurement and/or reporting, RRM measurement based on SCG measurement configuration;

(2) The signal measurement further includes one or more of the following behaviors of one or more SCells in the SCG: beam failure detection, beam failure recovery, uplink TAT operation, SRS transmission, CSI-RS measurement and/or reporting, RRM measurement based on SCG measurement configuration, RLM measurement;

(3) The signal measurement further includes both cases (1) and (2).

In the present embodiment, through performing RLM measurement for the PSCell, the terminal may detect the first information, that is, detect that a radio link failure occurs in the PSCell. In the case that the PSCell has a radio link failure, if the terminal further performs one or more of beam failure recovery, beam failure detection, uplink TAT operation, SRS transmission, CSI-RS measurement and/or reporting, RRM measurement based on SCG measurement configuration, or the RLM measurements for the SCG, these executions of signal measurement and/or timing is not that necessary, and the terminal may stop one or more executions of the signal measurement and/or the timing of the SCG, or one or more executions of the signal measurement and/or the timing of the PSCell in the SCG and/or a specified SCell in the SCG to reduce the power consumption of the terminal in the SCG deactivated state and improve the rationality of the behavior configuration of the terminal side.

For the meaning of the specified SCell, reference may be made to the foregoing embodiments and will not be repeated.

In the embodiment of the present application, if the terminal performs for the SCG one or more of beam failure detection, beam failure recovery, TAT operation, SRS transmission, CSI-RS measurement and/or reporting, RRM measurement based on SCG measurement configuration, RLM measurement the terminal stops one or more executions of the signal measurement and/or the timing of the SCG, or the PSCell and/or the specified SCell in the SCG when the terminal detects that a radio link failure occurs in the PSCell of the SCG, to reduce the power consumption of the terminal side in the SCG deactivated state and improving the flexibility and rationality of the behavior configuration of the terminal side.

In some embodiments, the terminal side includes one or more of signal measurement as follows: RRM measurement for the SCG, RLM measurement for the PSCell, CSI-RS measurement for the SCG and/or the PSCell, and the first information indicates a timer of one or more of signal measurement expires, so that in the case that the timer of one or more of signal measurement expires, the one or more of signal measurement which expire are reconfigured so as to improve the flexibility and rationality of the signal measurement configuration on the terminal side in the SCG deactivated state.

Further, in the process of reconfiguring one or more of signal measurement which expire, the measurement cycle of one or more of signal measurement which expire may be adjusted in the case of the expiration of the timer of one or more of signal measurement of the RRM measurement for the SCG, the RLM measurement for the PSCell, the CSI-RS measurement for the SCG and/or the PSCell, so as to improve the flexibility and rationality of the measurement cycle configuration of signal measurement on the terminal side in the SCG deactivated state.

When the measurement cycle of one or more of signal measurement which expire is adjusted, one possible implementation is that if the measurement cycle of the expiring signal measurement is the second cycle, the measurement cycle of the expiring signal measurement is switched from the second cycle to the first cycle according to the detected first information, where the first cycle is greater than the second cycle. Therefore, the expiring signal measurement is switched from a shorter measurement cycle to a longer measurement cycle and the timing of the signal measurement is restarted.

When the measurement cycle of one or more of signal measurement which expire is adjusted, another possible implementation is that if the measurement cycle of the expiring signal measurement is the first cycle, the measurement cycle of the expiring signal measurement is switched from the first cycle to the second cycle according to the detected first information. Therefore, the expiring signal measurement is switched from a longer measurement cycle to a shorter measurement cycle and the timing of the signal measurement is restarted.

Further, one or more of signal measurement of the RRM measurement for the SCG, the RLM measurement for the PSCell, the CSI-RS measurement for the SCG and/or the PSCell may be timed with a same timer, hence the expiration of the timer means that the RRM measurement for the SCG, the RLM measurement for the PSCell, the CSI-RS measurement for the SCG and/or the PSCell all expire. In one embodiment, one or more of signal measurement of the RRM measurement for the SCG, the RLM measurement for the PSCell, the CSI-RS measurement for the SCG and/or the PSCell may be timed with different timers, hence if there is a timer expires, the signal measurement corresponding to the timer may be determined as the expiring signal measurement and the expiring signal measurement may be reconfigured.

In some embodiments, the terminal behavior includes one or more of the following of signal measurement: RRM measurement for the SCG, RLM measurement for the PSCell, or CSI-RS measurement for the SCG and/or the PSCell, and the first information is the instruction information related to one or more of signal measurements received by the terminal and sent by the network device. Therefore, one or more of signal measurement indicated by the first information are reconfigured according to the first information. In other words, one or more of signal measurement indicated by the network device are reconfigured according to the instruction information related to the one or more of signal measurement received by the terminal and sent by the network device, so as to improve the flexibility and rationality of the signal measurement configuration in the SCG deactivated state. For example, the first information is the instruction information related to the RLM measurement for the PSCell received by the terminal and sent by the network device, and this signal measurement, i.e., the RLM measurement for the PSCell, is reconfigured according to the first information.

Further, when one or more of signal measurement indicated by the first information is reconfigured, the measurement cycle of the one or more of signal measurement indicated by the first information may be reconfigured to improve the flexibility and rationality of the measurement cycle configuration of signal measurement in the SCG deactivated state.

A possible implementation of reconfiguring the measurement cycle of one or more of signal measurement indicated by the first information includes: for the one or more of signal measurement indicated by the first information, if the measurement cycle of the signal measurement is a second cycle, the measurement cycle of the signal measurement is switched from the second cycle to a first cycle according to the first information.

A possible implementation of reconfiguring the measurement cycle of one or more of signal measurement indicated by the first information includes: for the one or more of signal measurement indicated by the first information, if the measurement cycle of the signal measurement is a first cycle, the measurement cycle of the signal measurement is switched from the first cycle to a second cycle according to the first information.

Therefore, the measurement cycle of one or more of signal measurement may be switched back and forth according to the instruction information of one or more of signal measurement from the network device, which effectively improves the flexibility and rationality of the measurement cycle configuration of the one or more of signal measurement in the SCG deactivated state.

Further, the network device may indicate the one or more of signal measurement of the RRM measurement of the SCG, the RLM measurement for the PSCell, the CSI-RS measurement for the SCG and/or the PSCell separately, or indicate the one or more of signal measurement of the RRM measurement for the SCG, the RLM measurement for the PSCell, the CSI-RS measurement for the SCG and/or the PSCell simultaneously by the same instruction information.

Figure 11:
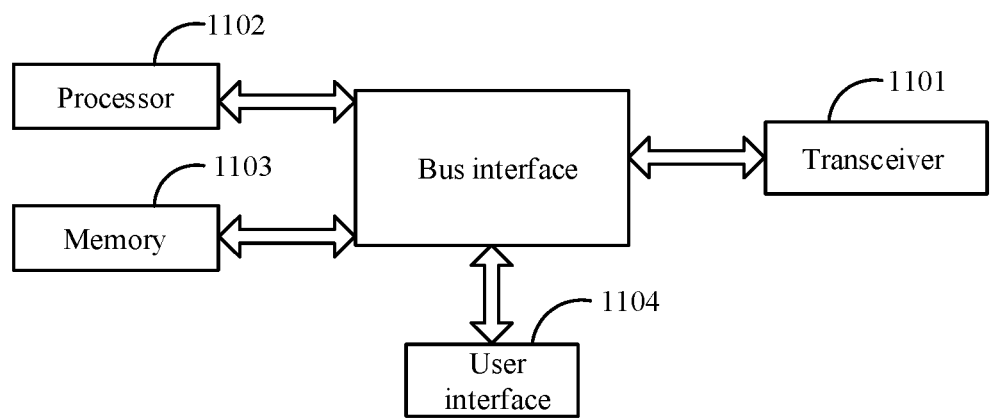
FIG. 11 is a schematic diagram of a terminal provided by an embodiment of the present application.

An embodiment of the present application provides a terminal, as shown in FIG. 11, the terminal may include a transceiver 1101, a processor 1102 and a memory 1103.

The transceiver 1101 is configured to receive and transmit data under the control of the processor 1102.

In FIG. 11, the bus architecture may include any number of interconnected buses and bridges, which are specifically linked by the various circuits of the one or more processors represented by the processor 1102 and the memory represented by the memory 1103. The bus architecture may also link other various circuits such as peripheral devices, voltage regulators, and power management circuits together, which are well known in the art and therefore will not be described further in the specification. The bus interface provides an interface. The transceiver 1101 may be a multiple elements, i.e., including a transmitter and a receiver, and providing a unit for communicating with other various devices on a transmission medium which includes a wireless channel, a wired channel, an optical cable and the like transmission medium. In an embodiment, the terminal may also include a user interface 1104, and for different user devices, the user interface 1104 may also be an interface which is capable of being connected with required devices externally and internally, and the connected devices include but are not limited to a keypad, a monitor, a speaker, a microphone, a joystick, etc.

The processor 1102 is responsible for managing the bus architecture and usual processing, and the memory 1103 may store data used by the processor 1102 to perform operations.

In an embodiment, the processor 1102 may be a central processing unit (central processing unit, CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD), and the processor may also use a multicore architecture.

The processor 1102 is configured to execute any of the methods related to the terminal device provided in the embodiments of the present application following the obtained executable instructions by calling the computer program stored in the memory 1103. The processor and the memory may also be physically separated.

The processor 1102 implements the following operations when executing the computer program stored in the memory 1103: determining signal measurement and/or timing of a terminal for a second cell group (SCG) and/or a primary SCG cell (PSCell) of the SCG when the SCG is in a deactivated state;

reconfiguring the signal measurement and/or the timing according to first information if the first information is acquired;

where the first information indicates a communication status between the terminal and the PSCell related to the signal measurement and/or the timing, or, the first information is instruction information of a network device received by the terminal.

In an embodiment, the signal measurement includes beam failure detection of the PSCell, and the first information indicates that the terminal detects a beam failure of the PSCell.

In an embodiment, processor 1102 is specifically configured to:

if the signal measurement further includes one or more of the following of the PSCell: beam failure recovery, sounding reference signal (SRS) transmission, channel state information reference signal (CSI-RS) measurement and/or reporting, radio resource management (RRM) measurement based on SCG measurement configuration, radio link monitoring (RLM) measurement, and/or, the timing includes uplink timing advance timer (TAT) operation of the PSCell, stop one or more executions of the signal measurement and/or the timing according to the first information; and/or, if the signal measurement further includes one or more of the following of the SCG: beam failure recovery, beam failure detection, SRS transmission, CSI-RS measurement and/or reporting, RRM measurement based on SCG measurement configuration, RLM measurement, and/or, the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG according to the first information.

In an embodiment, the timing includes uplink TAT operation of the PSCell, and the first information indicates that an uplink TAT of the PSCell expires.

In an embodiment, the processor 1102 is specifically configured to:

if the signal measurement includes one or more of the following of the primary SCG cell (PSCell): beam failure detection, beam failure recovery, SRS transmission, CSI-RS measurement and/or reporting, RRM measurement based on SCG measurement configuration, RLM measurement, stop one or more executions of the signal measurement and/or the timing according to the first information; and/or, if the signal measurement includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG according to the first information.

In an embodiment, the signal measurement further includes one or more of the following: RRM measurement for the SCG, RLM measurement for the PSCell, CSI-RS measurement for the SCG and/or the PSCell; and the processor 1102 is specifically configured to:
- for one or more of signal measurement, if a measurement cycle of the signal measurement is a first cycle, switch the measurement cycle of the signal measurement from the first cycle to a second cycle according to the first information; or
- for one or more of signal measurement, if a measurement cycle of the signal measurement is a second cycle, switch the measurement cycle of the signal measurement from the second cycle to a first cycle according to the first information;
- where the first cycle is greater than the second cycle.

In an embodiment, the signal measurement includes beam failure recovery of the PSCell, and the first information indicates that the terminal completes the beam failure recovery for the PSCell successfully; and/or,
the timing includes uplink TAT operation of the PSCell, and the first information indicates that the terminal restarts an uplink TAT for the PSCell.

In an embodiment, the signal measurement further includes one or more of the following: RRM measurement for the SCG, RLM measurement for the PSCell, CSI-RS measurement for the SCG and/or the PSCell; the processor 1102 is specifically configured to:
- for one or more of signal measurement, if a measurement cycle of the signal measurement is a second cycle, switch the measurement cycle of the signal measurement from the second cycle to a first cycle according to the first information; or
- for one or more of signal measurement, if a measurement cycle of the signal measurement is a first cycle, switch the measurement cycle of the signal measurement from the first cycle to a second cycle according to the first information;
- where the first cycle is greater than the second cycle.

In an embodiment, the signal measurement includes RLM measurement of the PSCell, and the first information indicates that the terminal detects that a radio link failure occurs in the PSCell.

In an embodiment, the processor 1102 is specifically configured to:
- if the signal measurement further includes one or more of the following of the PSCell: beam failure detection, beam failure recovery, SRS transmission, CSI-RS measurement and/or reporting, RRM measurement based on SCG measurement configuration, and/or the timing includes uplink TAT operation of the PSCell, stop one or more executions of the signal measurement and/or the timing according to the first information; and/or,
- if the signal measurement further includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG according to the first information.

In an embodiment, the signal measurement includes one or more of the following: RRM measurement for the SCG, RLM measurement for the PSCell, CSI-RS measurement for the SCG and/or the PSCell, and the first information indicates that a timer of one or more of the signal measurement expires; the processor 1102 is specifically configured to:
- if a measurement cycle of the signal measurement which expires is a second cycle, switch the measurement cycle of the signal measurement which expires from the second cycle to a first cycle according to the first information: or,
- if a measurement cycle of the signal measurement which expires is a first cycle, switch the measurement cycle of the signal measurement which expires from the first cycle to a second cycle according to the first information;
- where the first cycle is greater than the second cycle.

In an embodiment, the signal measurement includes one or more of the following: RRM measurement for the SCG, RLM measurement for the PSCell, CSI-RS measurement for the SCG and/or the PSCell, and the first information is instruction information related to one or more of the signal measurement received by the terminal and sent by the network device; the processor 1102 is specifically configured to:
- for one or more of the signal measurement indicated by the first information, if a measurement cycle of the signal measurement is a second cycle, switch the measurement cycle of the signal measurement from the second cycle to a first cycle according to the first information; or
- for one or more of the signal measurement indicated by the first information, if a measurement cycle of the signal measurement is a first cycle, switch the measurement cycle of the signal measurement from the first cycle to a second cycle according to the first information;
- where the first cycle is greater than the second cycle.

It should be noted herein that the above apparatus provided by the present application can implement all the method steps implemented by the terminal in the above method embodiments, and can achieve the same effect, and the same part and beneficial effect of method embodiments in the present embodiment will be not specifically described herein.

Figure 12:
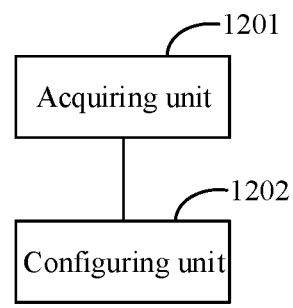
FIG. 12 is a schematic diagram of a communication apparatus in a deactivated state of a secondary cell group provided by an embodiment of the present application.

On the terminal side, an embodiment of the present application provides a communication apparatus in a deactivated state of a secondary cell group. As shown in FIG. 12, the communication apparatus in the deactivated state of the secondary cell group in the present embodiment includes: an acquiring unit 1201 and a configuring unit 1202.

The acquiring unit 1201 is configured to determine signal measurement and/or timing of a terminal for the secondary cell group (SCG) and/or a primary SCG cell (PSCell) of the SCG when the SCG is in the deactivated state;
the configuring unit 1202 is configured to reconfigure the signal measurement and/or the timing according to first information if the first information is acquired;
where the first information indicates a communication status between the terminal and the PSCell related to the signal measurement and/or the timing, or, the first information is instruction information of a network device received by the terminal.

In an embodiment, the signal measurement includes beam failure detection of the PSCell, and the first information indicates that the terminal detects a beam failure of the PSCell.

In an embodiment, the configuring unit 1202 is specifically configured to:

if the signal measurement further includes one or more of the following of the PSCell: beam failure recovery, sounding reference signal (SRS) transmission, channel state information reference signal (CSI-RS) measurement and/or reporting, radio resource management (RRM) measurement based on SCG measurement configuration, radio link monitoring (RLM) measurement, and/or, the timing includes uplink timing advance timer (TAT) operation of the PSCell, stop one or more executions of the signal measurement and/or the timing according to the first information; and/or, if the signal measurement further includes one or more of the following of the SCG: beam failure recovery, beam failure detection, SRS transmission, CSI-RS measurement and/or reporting, RRM measurement based on SCG measurement configuration, RLM measurement, and/or, the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG according to the first information.

In an embodiment, the timing includes uplink TAT operation of the PSCell, and the first information indicates that an uplink TAT of the PSCell expires.

In an embodiment, the configuring unit 1202 is specifically configured to:

if the signal measurement includes one or more of the following of the primary SCG cell (PSCell): beam failure detection, beam failure recovery, SRS transmission, CSI-RS measurement and/or reporting, RRM measurement based on SCG measurement configuration, RLM measurement, stop one or more executions of the signal measurement and/or the timing according to the first information; and/or, if the signal measurement includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG according to the first information.

In an embodiment, the signal measurement further includes one or more of the following: RRM measurement for the SCG, RLM measurement for the PSCell, CSI-RS measurement for the SCG and/or the PSCell; the configuring unit 1202 is specifically configured to:

for one or more of the signal measurement, if a measurement cycle of the signal measurement is a first cycle, switch the measurement cycle of the signal measurement from the first cycle to a second cycle according to the first information; or for one or more of the signal measurement, if a measurement cycle of the signal measurement is a second cycle, switch the measurement cycle of the signal measurement from the second cycle to a first cycle according to the first information;

where the first cycle is greater than the second cycle.

In an embodiment, the signal measurement includes beam failure recovery of the PSCell, and the first information indicates that the terminal completes the beam failure recovery for the PSCell successfully; and/or, the timing includes uplink TAT operation of the PSCell, and the first information indicates that the terminal restarts an uplink TAT for the PSCell.

In an embodiment, the signal measurement further includes one or more of the following: RRM measurement for the SCG, RLM measurement for the PSCell, CSI-RS measurement for the SCG and/or the PSCell; the configuring unit 1202 is specifically configured to:

for one or more of the signal measurement, if a measurement cycle of the signal measurement is a second cycle, switch the measurement cycle of the signal measurement from the second cycle to a first cycle according to the first information; or for one or more of the signal measurement, if the measurement cycle of the signal measurement is a first cycle, switch the measurement cycle of the signal measurement from the first cycle to a second cycle according to the first information; where the first cycle is greater than the second cycle.

In an embodiment, the signal measurement includes RLM measurement of the PSCell, and the first information indicates that the terminal detects that a radio link failure occurs in the PSCell.

In an embodiment, the configuring unit 1202 is specifically configured to:

if the signal measurement further includes one or more of the following of the PSCell: beam failure detection, beam failure recovery, SRS transmission, CSI-RS measurement and/or reporting, RRM measurement based on SCG measurement configuration, and/or the timing includes uplink TAT operation of the PSCell, stop one or more executions of the signal measurement and/or the timing according to the first information; and/or, if the signal measurement further includes one or more of the following of the SCG: beam failure detection, beam failure recovery, SRS transmission, CSI-RS measurement and/or reporting, RRM measurement based on SCG measurement configuration, RLM measurement, and/or the timing includes uplink TAT operation of the SCG, stop one or more executions of the signal measurement and/or the timing of the SCG, or one or more executions of the signal measurement and/or the timing of the PSCell in the SCG and/or a specified secondary cell (SCell) in the SCG according to the first information.

In an embodiment, the signal measurements include one or more of the following: RRM measurement for the SCG, RLM measurement for the PSCell, CSI-RS measurement for the SCG and/or the PSCell, and the first information indicates that a timer of one or more of the signal measurement expires; the configuring unit 1202 is specifically configured to:

if a measurement cycle of the signal measurement which expires is a second cycle, switch the measurement cycle of the signal measurement which expires from the second cycle to a first cycle according to the first information: or, if the measurement cycle of the signal measurement which expires is a first cycle, switch the measurement cycle of the signal measurement which expires from the first cycle to a second cycle according to the first information;

where the first cycle is greater than the second cycle.

In an embodiment, the signal measurement includes one or more of the following: RRM measurement for the SCG, RLM measurement for the PSCell, CSI-RS measurement for the SCG and/or the PSCell, and the first information is instruction information related to one or more of the signal measurement received by the terminal and sent by the network device; the configuring unit 1202 is specifically configured to:

for one or more of the signal measurement indicated by the first information, if a measurement cycle of the signal measurement is a second cycle, switch the measurement cycle of the signal measurement from the second cycle to a first cycle according to the first information; or for one or more of the signal measurement indicated by the first information, if the measurement cycle of the signal measurement is a first cycle, switch the measurement cycle of the signal measurement from the first cycle to a second cycle according to the first information;

where the first cycle is greater than the second cycle.

It should be noted herein that the above apparatus provided by the present application can implement all the method steps implemented by the terminal in the above method embodiments, and can achieve the same effect, and the same part and beneficial effect of the method embodiments in the present embodiment will be not specifically described herein.

Embodiment 1

Determine signal measurement and/or timing of a terminal for a secondary cell group (SCG) and/or a primary SCG cell (PSCell) of the SCG when the SCG is in a deactivated state;

reconfigure the signal measurement and/or the timing according to first information if the first information is acquired.

The first information indicates a communication status between the terminal and the PSCell related to the signal measurement and/or the timing, or, the first information is instruction information of a network device received by the terminal.

In an embodiment, the determined signal measurement includes beam failure detection of the PSCell, and the first information indicates that the terminal detects a beam failure of the PSCell.

In an embodiment, if the first information indicates that the terminal detects a beam failure of the PSCell, the reconfiguring the signal measurement according to the first information includes at least one of the following:

if the first information indicates that the terminal detects a beam failure of the PSCell, stopping, according to the first information, one or more executions of the following of the PSCell: beam failure recovery, sounding reference signal (SRS) transmission, channel state information reference signal (CSI-RS) measurement and/or reporting, radio resource management (RRM) measurement based on SCG measurement configuration, radio link monitoring (RLM) measurement;

if the first information indicates that the terminal detects a beam failure of the PSCell, stopping, according to the first information, one or more executions of the SCG: beam failure recovery, beam failure detection, SRS transmission, CSI-RS measurement and/or reporting, RRM measurement based on SCG measurement configuration, RLM measurement;

if the first information indicates that the terminal detects a beam failure of the PSCell, stopping, according to the first information, one or more executions of the following of a specified secondary cell (SCell) of the SCG: beam failure recovery, beam failure detection, SRS transmission, CSI-RS measurement and/or reporting, RRM measurement based on SCG measurement configuration, RLM measurement,.

If the first information indicates that the terminal detects a beam failure of the PSCell, the reconfiguring the timing according to the first information includes:

if the first information indicates that the terminal detects a beam failure of the PSCell, stopping, according to the first information, performing uplink timing advance timer (TAT) operation of the PSCell included in the timing and/or, if the first information indicates that the terminal detects a beam failure of the PSCell, stopping, according to the first information, performing one or more of the timing of the SCG and/or a specified secondary cell (SCell) of the SCG, the timing including uplink TAT operation of the SCG.

Embodiment 2

Determine signal measurement and/or timing of a terminal for a secondary cell group (SCG) and/or a primary SCG cell (PSCell) of the SCG when the SCG is in a deactivated state;

reconfigure the signal measurement and/or the timing according to first information if the first information is acquired.

The first information indicates a communication status between the terminal and the PSCell related to the signal measurement and/or the timing, or, the first information is instruction information of a network device received by the terminal.

In an embodiment, the determined timing includes uplink TAT operation of the PSCell, and the first information indicates that an uplink TAT of the PSCell expires.

In an embodiment, if the first information indicates that the uplink TAT of the PSCell expires, the reconfiguring the signal measurement according to the first information includes at least one of the following:

if the first information indicates that the uplink TAT of the PSCell expires, stopping, according to the first information, one or more executions of the following of the PSCell: beam failure recovery, sounding reference signal (SRS) transmission, channel state information reference signal (CSI-RS) measurement and/or reporting, radio resource management (RRM) measurement based on SCG measurement configuration, radio link monitoring (RLM) measurement;

if the first information indicates that the uplink TAT of the PSCell expires, stopping, according to the first information, one or more executions of the following of the SCG: beam failure detection, beam failure recovery, SRS transmission, CSI-RS measurement and/or reporting, RRM measurement based on SCG measurement configuration, RLM measurement;

if the first information indicates that the uplink TAT of the PSCell expires, stopping, according to the first information, one or more executions of the following of a specified secondary cell (SCell) of the SCG: beam failure detection, beam failure recovery, SRS transmission, CSI-RS measurement and/or reporting, RRM measurement based on SCG measurement configuration, RLM measurement.

In an embodiment if the first information indicates that the uplink TAT of the PSCell expires, the reconfiguring the timing according to the first information includes:
if the first information indicates that the uplink TAT of the PSCell expires, stopping, according to the first information, performing one or more of the timing of the SCG and/or a specified secondary cell (SCell) of the SCG, the timing including uplink TAT operation of the SCG.

Embodiment 3

Determine signal measurement and/or timing of a terminal for a secondary cell group (SCG) and/or a primary SCG cell (PSCell) of the SCG when the SCG in a deactivated state;
reconfigure the signal measurement and/or the timing according to first information if the first information is acquired.

The first information indicates a communication status between the terminal and the PSCell related to the signal measurement and/or the timing, or, the first information is instruction information of a network device received by the terminal.

In an embodiment, if the first information indicates that an uplink TAT of the PSCell expires; or, if the first information indicates that the terminal detects a beam failure of the PSCell; or, if the first information indicates that the terminal completes beam failure recovery for the PSCell successfully; or, if the first information indicates that the terminal restarts an uplink TAT for the PSCell, then when the signal measurement includes one or more of RRM measurement for the SCG, RLM measurement for the PSCell, CSI-RS measurement for the SCG, CSI-RS measurement for the PSCell, the reconfiguring the signal measurement according to the first information includes:
adjusting a measurement cycle of the signal measurement.
For example, for one or more of the signal measurement, if a measurement cycle of the signal measurement is a first cycle, the measurement cycle of the signal measurement is switched from the first cycle to a second cycle according to the first information; or for one or more of the signal measurement, if the measurement cycle of the signal measurement is the second cycle, the measurement cycle of the signal measurement is switched from the second cycle to the first cycle according to the first information; where the first cycle is greater than the second cycle.

Embodiment 4

Determine signal measurement and/or timing of a terminal for a secondary cell group (SCG) and/or a primary SCG cell (PSCell) of the SCG when the SCG is in a deactivated state;
reconfigure the signal measurement and/or the timing according to first information if the first information is acquired.

The first information indicates a communication status between the terminal and the PSCell related to the signal measurement and/or the timing, or, the first information is instruction information of a network device received by the terminal.

In an embodiment, the signal measurement includes RLM measurement of the PSCell, and the first information indicates that the terminal detects that a radio link failure occurs in the PSCell.

In an embodiment, if the first information indicates that the terminal detects that a radio link failure occurs in the PSCell, the reconfiguring the signal measurement according to the first information includes:
if the first information indicates that the terminal detects that a radio link failure occurs in the PSCell, the reconfiguring the signal measurement according to the first information includes at least one of the following:
if the first information indicates that the terminal detects that a radio link failure occurs in the PSCell, stopping, according to the first information, one or more executions of the following of the PSCell: beam failure recovery, sounding reference signal (SRS) transmission, channel state information reference signal (CSI-RS) measurement and/or reporting, radio resource management (RRM) measurement based on SCG measurement configuration;
if the first information indicates that the terminal detects that a radio link failure occurs in the PSCell, stopping, according to the first information, performing one or more of the following of the SCG: beam failure detection, beam failure recovery, SRS transmission, CSI-RS measurement and/or reporting, RRM measurement based on SCG measurement configuration, RLM measurement;
if the first information indicates that the terminal detects that a radio link failure occurs in the PSCell, stopping, according to the first information, performing one or more of the following of a specified secondary cell (SCell) of the SCG: beam failure detection, beam failure recovery, SRS transmission, CSI-RS measurement and/or reporting, RRM measurement based on SCG measurement configuration, RLM measurement.

In an embodiment, if the first information indicates that the terminal detects that a radio link failure occurs in the PSCell, the reconfiguring the timing according to the first information includes:
if the first information indicates that the terminal detects that a radio link failure occurs in the PSCell, stopping, according to the first information, performing uplink timing advance timer (TAT) operation of the PSCell; and/or,
if the first information indicates that the terminal detects that a radio link failure occurs in the PSCell, stopping, according to the first information, performing one or more of the timing of the SCG and/or a specified secondary cell (SCell) of the SCG, the timing including uplink TAT operation of the SCG.

Embodiment 5

Determine signal measurement and/or timing of a terminal for a secondary cell group (SCG) and/or a primary SCG cell (PSCell) of the SCG when the SCG is in a deactivated state;
reconfigure the signal measurement and/or the timing according to first information if the first information is acquired.

The first information indicates a communication status between the terminal and the PSCell related to the signal measurement and/or the timing, or, the first information is instruction information of a network device received by the terminal.

In an embodiment, if the first information indicates that a timer of one or more of the signal measurement expires; or the first information is instruction information related to one or more of the signal measurement received by the terminal and sent by the network device, the reconfiguring the signal measurement according to the first information includes:

when the signal measurement includes one or more of RRM measurement for the SCG, RLM measurement for the PSCell, CSI-RS measurement for the SCG, CSI-RS measurement for the PSCell, the reconfiguring the signal measurement according to the first information includes:

adjusting a measurement cycle of the signal measurement.

Specifically, if a measurement cycle of the signal measurement which expires is a second cycle, the measurement cycle of the signal measurement which expires is switched from the second cycle to a first cycle according to the first information: or, if a measurement cycle of the signal measurement which expires is a first cycle, the measurement cycle of the signal measurement which expires is switched from the first cycle to a second cycle according to the first information;

where the first cycle is greater than the second cycle.

Specifically, for one or more of the signal measurement indicated by the first information, if a measurement cycle of the signal measurement is a second cycle, the measurement cycle of the signal measurement is switched from the second cycle to a first cycle according to the first information; or for one or more of the signal measurement indicated by the first information, if a measurement cycle of the signal measurement is the first cycle, the measurement cycle of the signal measurement is switched from the first cycle to a second cycle according to the first information;

where the first cycle is greater than the second cycle.

It should be noted that the division of units in the embodiments of the present application is schematic, which is merely a logical function division, and the actual implementation may have another division method. Further, various functional units in the embodiments of the present application may be integrated in a processing unit, or each unit may exist physically alone, or two or more units may be integrated in a unit. The above integrated unit may be implemented in the form of hardware or in the form of a software function unit.

The integrated unit described above may be stored in a processor-readable storage medium if implemented as a software functional unit and sold or used as a stand-alone product. Based on this understanding, the embodiments of the present application essentially, or the part contributing to the prior art, or all or part of the embodiment may be embodied in the form of a software product, and the computer software product is stored in a storage medium, and includes a number of instructions to enable a computer device (which may be a personal computer, a server, or a network device, etc.) or a processor to perform all or part of the steps described in various embodiments of the present application. The aforementioned storage medium include: a U disk, a portable hard disk, a read-only memory (ROM), a random access memory (RAM), a disk or a CD and other medium that can store program code.

On the terminal side, an embodiment of the present application provide a processor-readable storage medium, the processor-readable storage medium is stored with a computer program, the computer program is used to enable a processor to perform any of the methods provided by the embodiment of the present application related to the terminal, so that the processor can implement all the method steps implemented by the terminal in the above method embodiments, and can achieve the same effect, and the part and beneficial effect in the present embodiment which are the same as those of the method embodiments will be not specifically described herein.

The processor-readable storage medium may be any available medium or data storage device accessible to the processor, including but not limited to a magnetic memory (e.g., a floppy disk, a hard disk, a tape, a magnetic optical disk (MO), an optical memory (e.g., CD, DVD, BD, HVD, etc.), and a semiconductor memory (e.g., a ROM, an EPROM, an EEPROM, a non-volatile memory (NAND FLASH), a solid-state disk (SSD)) etc.

On the terminal side, an embodiment of the present application also provides a computer program product including instructions, the computer program is stored in a storage medium, at least one processor can read the computer program from the storage medium, and the at least one processor can implement all the method steps implemented by the terminal in the above method embodiments when executing the computer program, and can achieve the same effect, and the part and beneficial effect of the present embodiment which are the same as those of the method embodiments will be not specifically described herein.

An embodiment of the present application also provides a communication system, including a network device and a terminal. The terminal is the terminal described in the above apparatus embodiments, which is able to perform all the method steps performed by the terminal in the above method embodiments, and can achieve the same effect. The part and beneficial effect of the present embodiment which are the same as those of the method embodiments will be not specifically described herein.

The embodiments of the present application may be provided as a method, a system, or a computer program product. Accordingly, the present application may take the form of a complete hardware embodiment, a complete software embodiment, or a combination of software and hardware embodiment. Further, the present application may take the form of a computer program product implemented on one or more computer-usable storage medium (including but not limited to a disk memory and an optical memory, etc.) including computer-usable program code.

The present application is described with reference to flow diagrams and/or block diagrams of a method, an apparatus, and a computer program product according to the embodiments of the present application. It should be understood that each process and/or block in the flow diagrams and/or the block diagrams and a combination of processes and/or blocks in the flow diagrams and/or the block diagrams may be implemented by computer-executable instructions. These computer-executable instructions may be provided to a general-purpose computer, a special-purpose computer, an embedded processor or a processor of other programmable data processing device to produce a machine, and the instructions executed by the processor of a computer or other programmable data processing device produce an apparatus for implementing the functions specified in one or more processes of the flow diagrams and/or one or more blocks of the block diagrams.

These processor-executable instructions may also be stored in a processor-readable memory capable of booting a computer or other programmable data processing device to work in a particular manner, and the instructions stored in the processor-readable memory produce a manufactured product including an instruction apparatus, and the instruction apparatus implements the functions specified in one or more processes of the flow diagrams and/or one or more blocks of the block diagrams.

These processor-executable instructions may also be loaded into a computer or other programmable data processing device, and a series of operational steps are executed on the computer or other programmable device to produce computer-implemented processing, so that the instructions executed on the computer or other programmable device provide steps for implementing the functions specified in one or more processes of the flow diagrams and/or one or more blocks of the block diagrams.

Thus, if these modifications and variants of the present application fall within the scope of the claims of the present application and their equivalents, the present application is also intended to include these modifications and variants.

The invention claimed is:

1. A communication method in a deactivated state of a secondary cell group (SCG), applied to a terminal, wherein the method comprises:
    determining signal measurement and/or timing of the SCG and/or a primary SCG cell (PSCell) of the SCG when the SCG is in the deactivated state;
    reconfiguring the signal measurement and/or the timing according to first information if the first information is acquired;
    wherein the first information indicates a communication status between the terminal and the PSCell related to the signal measurement and/or the timing, or, the first information is instruction information of a network device received by the terminal;
    wherein the signal measurement comprises beam failure detection of the PSCell, and the first information indicates that the terminal detects a beam failure of the PSCell.

2. The method according to claim 1, wherein the reconfiguring the signal measurement and/or the timing according to the first information comprises:
    if the signal measurement further comprises one or more of the following of the PSCell: beam failure recovery, sounding reference signal (SRS) transmission, channel state information reference signal (CSI-RS) measurements and/or reporting, radio resource management (RRM) measurements based on SCG measurement configuration, RLM measurements, and/or, the timing comprises uplink timing advance timer (TAT) operation of the PSCell, stopping one or more executions of the signal measurement and/or the timing according to the first information; and/or,
    if the signal measurement further comprises one or more of the following of the SCG: beam failure recovery, beam failure detection, SRS transmission, CSI-RS measurement and/or reporting, RRM measurement based on SCG measurement configuration, RLM measurement, and/or, the timing comprises uplink TAT operation of the SCG, stopping one or more executions of the signal measurement and/or the timing of the SCG, or one or more executions of the signal measurement and/or the timing of the PSCell in the SCG and/or a specified secondary cell SCell in the SCG, according to the first information.

3. The method according to claim 1, wherein the method further comprises at least one of the following cases:

a first case: the timing comprises uplink timing advance timer (TAT) operation of the PSCell, and the first information indicates that an uplink TAT of the PSCell expires;
    a second case: the signal measurement includes beam failure recovery of the PSCell, and the first information indicates that the terminal completes the beam failure recovery for the PSCell successfully; and/or, the timing includes uplink TAT operation of the PSCell, and the first information indicates that the terminal restarts an uplink TAT for the PSCell;
    a third case: the signal measurement includes one or more of the following: radio resource management (RRM) measurement for the SCG, radio link monitoring (RLM) measurement for the PSCell, channel state information reference signal (CSI-RS) measurement for the SCG and/or the PSCell, and the first information indicates that a timer of one or more of the signal measurement expires; or
    a fourth case: the signal measurement includes one or more of the following: RRM measurement for the SCG, RLM measurement for the PSCell, CSI-RS measurement for the SCG and/or the PSCell, and the first information is instruction information related to one or more of the signal measurement received by the terminal and sent by the network device.

4. The method according to claim 3, wherein for the first case, the reconfiguring the signal measurement and/or the timing according to the first information comprises:
    if the signal measurement comprises one or more of the following of the PSCell: beam failure detection, beam failure recovery, SRS transmission, CSI-RS measurement and/or reporting, RRM measurement based on SCG measurement configuration, RLM measurement, stopping one or more executions of the signal measurement and/or the timing according to the first information; and/or,
    if the signal measurement comprises one or more of the following of the SCG: beam failure detection, beam failure recovery, SRS transmission, CSI-RS measurement and/or reporting, RRM measurement based on SCG measurement configuration, RLM measurement, and/or the timing comprises uplink TAT operation of the SCG, stopping one or more executions of the signal measurement and/or the timing of the SCG, or one or more executions of the signal measurement and/or the timing of the PSCell in the SCG and/or a specified SCell in the SCG, according to the first information.

5. The method according to claim 1, wherein the signal measurement further comprises one or more of the following: RRM measurement for the SCG, RLM measurement for the PSCell, CSI-RS measurement for the SCG and/or the PSCell;
    the reconfiguring the signal measurement and/or the timing according to the first information comprises:
    for one or more of the signal measurement, if a measurement cycle of the signal measurement is a first cycle, switching the measurement cycle of the signal measurement from the first cycle to a second cycle according to the first information; or
    for one or more of the signal measurement, if the measurement cycle of the signal measurement is a second cycle, switching the measurement cycle of the signal measurement from the second cycle to a first cycle according to the first information;
    wherein the first cycle is greater than the second cycle.

6. The method according to claim 3, wherein for the second case, the signal measurement further comprises one or more of the following: RRM measurement for the SCG, RLM measurement for the PSCell, CSI-RS measurement for the SCG and/or the PSCell;

the reconfiguring the signal measurement and/or the timing according to the first information comprises:

for one or more of the signal measurement, if a measurement cycle of the signal measurement is a second cycle, switching the measurement cycle of the signal measurement from the second cycle to a first cycle according to the first information; or for one or more of the signal measurement, if a measurement cycle of the signal measurement is a first cycle, switching the measurement cycle of the signal measurement from the first cycle to a second cycle according to the first information;

wherein the first cycle is greater than the second cycle.

7. A communication method in a deactivated state of a secondary cell group (SCG), applied to a terminal, wherein the method comprises:

determining signal measurement and/or timing of the SCG and/or a primary SCG cell (PSCell) of the SCG when the SCG is in the deactivated state;

reconfiguring the signal measurement and/or the timing according to first information if the first information is acquired;

wherein the first information indicates a communication status between the terminal and the PSCell related to the signal measurement and/or the timing, or, the first information is instruction information of a network device received by the terminal;

wherein the signal measurement comprises radio link monitoring (RLM) measurement of the PSCell, and the first information indicates that the terminal detects that a radio link failure occurs in the PSCell.

8. The method according to claim 3, wherein for the third case, the reconfiguring the signal measurement and/or the timing according to the first information comprises:

if a measurement cycle of the signal measurement which expires is a second cycle, switching the measurement cycle of the signal measurement which expires from the second cycle to a first cycle according to the first information: or, if a measurement cycle of the signal measurement which expires is a first cycle, switching the measurement cycle of the signal measurement which expires from the first cycle to a second cycle according to the first information;

wherein the first cycle is greater than the second cycle.

9. The method according to claim 3, wherein for the fourth case, the reconfiguring the signal measurement and/or the timing according to the first information comprises:

for one or more of the signal measurement indicated by the first information, if a measurement cycle of the signal measurement is a second cycle, switching the measurement cycle of the signal measurement from the second cycle to a first cycle according to the first information; or for one or more of the signal measurement indicated by the first information, if a measurement cycle of the signal measurement is the first cycle, switching the measurement cycle of the signal measurement from the first cycle to a second cycle according to the first information;

wherein the first cycle is greater than the second cycle.

10. A terminal, comprising: a memory, a transceiver, and a processor;

the memory being configured to store a computer program;

the transceiver being configured to send and receive data under control of the processor;

the processor being configured to read the computer program in the memory and execute the following operations:

determining signal measurement and/or timing of a secondary cell group (SCG) and/or a primary SCG cell (PSCell) of the SCG when the SCG is in a deactivated state;

reconfiguring the signal measurement and/or timing according to first information if the first information is acquired;

wherein the first information indicates a communication status between the terminal and the PSCell related to the signal measurement and/or the timing, or, the first information is instruction information of a network device received by the terminal;

wherein the signal measurement comprises beam failure detection of the PSCell, and the first information indicates that the terminal detects a beam failure of the PSCell.

11. The terminal according to claim 10, wherein the processor is configured to:

if the signal measurement further comprises one or more of the following of the PSCell: beam failure recovery, sounding reference signal (SRS) transmission, channel state information reference signal (CSI-RS) measurement and/or reporting, radio resource management (RRM) measurement based on SCG measurement configuration, RLM measurement, and/or, the timing comprises uplink timing advance timer (TAT) operation of the PSCell, stop one or more executions of the signal measurement and/or the timing according to the first information; and/or, if the signal measurement further comprises one or more of the following of the SCG: beam failure recovery, beam failure detection, SRS transmission, CSI-RS measurement and/or reporting, RRM measurement based on SCG measurement configuration, RLM measurement, and/or, the timing comprises uplink TAT operation of the SCG, stop one or more executions of the signal measurement and/or the timing of the SCG, or one or more executions of the signal measurement and/or the timing of the PSCell in the SCG and/or a specified secondary cell SCell in the SCG, according to the first information.

12. The terminal according to claim 10, wherein the timing comprises uplink TAT operation of the PSCell, and the first information indicates that an uplink TAT of the PSCell expires.

13. The terminal according to claim 12, wherein the processor is configured to:

if the signal measurement comprises one or more of the following of the PSCell: beam failure detection, beam failure recovery, SRS transmission, CSI-RS measurement and/or reporting, RRM measurement based on SCG measurement configuration, RLM measurement, stop one or more executions of the signal measurement and/or the timing according to the first information; and/or, if the signal measurement comprises one or more of the following of the SCG: beam failure detection, beam failure recovery, SRS transmission, CSI-RS measurement and/or reporting, RRM measurement based on SCG measurement configuration, RLM measurement, and/or the timing comprises uplink TAT operation of SCG, stop one or more executions of the signal measurement and/or the timing of the SCG, or one or more executions of the signal measurement and/or the timing of the PSCell in the SCG and/or a specified SCell in the SCG, according to the first information.

14. The method according to claim 7, wherein the reconfiguring the signal measurement and/or the timing according to the first information comprises:
if the signal measurement further comprises one or more of the following of the PSCell: beam failure detection, beam failure recovery, SRS transmission, CSI-RS measurement and/or reporting, RRM measurement based on SCG measurement configuration, and/or the timing comprises uplink TAT operation of the PSCell, stopping one or more executions of the signal measurement and/or the timing according to the first information; and/or,
if the signal measurement further comprises one or more of the following of the SCG: beam failure detection, beam failure recovery, SRS transmission, CSI-RS measurement and/or reporting, RRM measurement based on SCG measurement configuration, RLM measurement, and/or the timing comprises uplink TAT operation of the SCG, stopping one or more executions of the signal measurement and/or the timing of the SCG, or one or more executions of the signal measurement and/or the timing of the PSCell in the SCG and/or a specified SCell in the SCG, according to the first information.

* * * * *